US012810815B2

(12) United States Patent
Kim et al.

(10) Patent No.: US 12,810,815 B2
(45) Date of Patent: Nov. 24, 2026

(54) ELECTRONIC DEVICE INCLUDING DISPLAY AND METHOD FOR OPERATING SAME

(71) Applicant: SAMSUNG ELECTRONICS CO., LTD., Suwon-si (KR)

(72) Inventors: Hongsuk Kim, Suwon-si (KR); Jongmin Yoon, Suwon-si (KR); Joungmin Cho, Suwon-si (KR); Kwangtai Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/170,683

(22) Filed: Apr. 4, 2025

(65) Prior Publication Data

US 2025/0232735 A1 Jul. 17, 2025

Related U.S. Application Data

(63) Continuation of application No. PCT/KR2023/015310, filed on Oct. 5, 2023.

(30) Foreign Application Priority Data

Oct. 5, 2022 (KR) ........................ 10-2022-0126970
Nov. 4, 2022 (KR) ........................ 10-2022-0145927

(51) Int. Cl.
*G09G 3/3291* (2016.01)
*G09G 3/00* (2006.01)
*G09G 3/3233* (2016.01)

(52) U.S. Cl.
CPC ......... *G09G 3/3291* (2013.01); *G09G 3/3233* (2013.01); *G09G 3/006* (2013.01);
(Continued)

(58) Field of Classification Search
CPC .... G09G 3/3291; G09G 3/3233; G09G 3/006; G09G 2300/0852; G09G 2330/021; G09G 2354/00; G09G 2380/02
See application file for complete search history.

(56) References Cited

U.S. PATENT DOCUMENTS 9,292,381 B2 3/2016 Shalvi et al.
9,899,634 B2 2/2018 Cha et al.
(Continued)

FOREIGN PATENT DOCUMENTS

JP 2004070186 A 3/2004
JP 4119198 B2 7/2008
(Continued)

OTHER PUBLICATIONS

Extended European Search Report dated Aug. 22, 2025 for EP Application No. 23875228.1.
(Continued)

*Primary Examiner* — Ariel A Balaoing
(74) *Attorney, Agent, or Firm* — Nixon & Vanderhye P.C.

(57) ABSTRACT

An electronic device may include: a display in which a plurality of pixels are arranged; a display storage in which are arranged a plurality of pixel memories storing data voltage information for lighting the plurality of pixels; a display driver IC (DDI) that operates the display and the display storage; a processor that controls the operation of the display driver; and a memory operatively connected to the processor. The memory may include instructions for storing data voltage information in the display storage and loading the stored data voltage information during one frame period when executed by the processor. Various other embodiments are also possible.

20 Claims, 22 Drawing Sheets

(52) U.S. Cl.
CPC ............... *G09G 2300/0852* (2013.01); *G09G 2330/021* (2013.01); *G09G 2354/00* (2013.01); *G09G 2380/02* (2013.01)

(56) References Cited

U.S. PATENT DOCUMENTS

| | | | | |
|---|---|---|---|---|
| 10,360,958 | B2 | 7/2019 | Debrosse et al. | |
| 2004/0041761 | A1 | 3/2004 | Sugita et al. | |
| 2004/0258866 | A1 | 12/2004 | Shiba et al. | |
| 2007/0222723 | A1 | 9/2007 | Sugita et al. | |
| 2009/0184901 | A1* | 7/2009 | Kwon .................. | G09G 3/3233 345/77 |
| 2009/0189924 | A1* | 7/2009 | Ogura .................. | G09G 3/3233 345/690 |
| 2010/0177072 | A1 | 7/2010 | Kawabe | |
| 2013/0113778 | A1* | 5/2013 | Yoshimoto ........... | G09G 3/3648 345/212 |
| 2014/0362062 | A1* | 12/2014 | Limketkai ............ | G09G 3/3233 345/82 |
| 2015/0243332 | A1 | 8/2015 | Koyama | |
| 2015/0340091 | A1 | 11/2015 | Zhu et al. | |
| 2016/0155859 | A1 | 6/2016 | Kimura et al. | |
| 2017/0287399 | A1 | 10/2017 | Ahmed et al. | |
| 2018/0097158 | A1 | 4/2018 | Estrada et al. | |
| 2019/0064555 | A1 | 2/2019 | Hosseini et al. | |
| 2020/0303007 | A1 | 9/2020 | Shirai | |
| 2021/0233463 | A1 | 7/2021 | Lee et al. | |
| 2021/0257020 | A1 | 8/2021 | Ishizu et al. | |
| 2021/0304682 | A1* | 9/2021 | Wang ................... | G09G 3/2014 |
| 2022/0122658 | A1 | 4/2022 | Lee et al. | |
| 2022/0343966 | A1* | 10/2022 | Lee ..................... | G11C 11/4085 |
| 2023/0419891 | A1* | 12/2023 | Yamazaki ............ | G09G 3/3208 |

FOREIGN PATENT DOCUMENTS

| | | | |
|---|---|---|---|
| JP | 2015172991 | A | 10/2015 |
| JP | 2020155192 | A | 9/2020 |
| JP | 7100732 | B2 | 7/2022 |
| JP | 7213848 | B2 | 1/2023 |
| JP | 7427972 | B2 | 1/2024 |
| KR | 10-0902245 | B1 | 6/2009 |
| KR | 100979596 | B1 | 9/2010 |
| KR | 101367420 | B1 | 2/2014 |
| KR | 101401862 | B1 | 5/2014 |
| KR | 20180108779 | A | 10/2018 |
| KR | 20180122371 | A | 11/2018 |
| KR | 20190057705 | A | 5/2019 |
| KR | 20190062517 | A | 6/2019 |
| KR | 102137639 | B1 | 7/2020 |
| KR | 20220050303 | A | 4/2022 |
| WO | 2014107335 | A1 | 7/2014 |
| WO | 2019243957 | A1 | 12/2019 |
| WO | 2022118151 | A1 | 6/2022 |

OTHER PUBLICATIONS

International Search Report for PCT/KR2023/015310 dated Jan. 17, 2024, 5 pages.
Written Opinion of the ISA for PCT/KR2023/015310 dated Jan. 17, 2024, 6 pages.
Korean Office Action dated Jul. 9, 2026 for KR Application No. 10-2022-0145927.

* cited by examiner

FIG. 19

1900

| | PCM | DRAM |
|---|---|---|
| **Delay & Timing** | | |
| tRCD (cy) | 22 | 5 |
| tCL (cy) | 5 | 5 |
| tWL (cy) | 4 | 4 |
| tCCD (cy) | 4 | 4 |
| tWTR (cy) | 3 | 3 |
| tWR (cy) | 6 | 6 |
| tRTP (cy) | 3 | 3 |
| tRP (cy) | 60 | 5 |
| tRRDact (cy) | 2 | 3 |
| tRRDpre (cy) | 11 | 3 |
| **Energy** | | |
| Array read (pJ/bit) | 2.47 | 1.17 |
| Array write (pJ/bit) | 16.82 | 0.39 |
| Buffer read (pJ/bit) | 0.93 | 0.93 |
| Buffer write (pJ/bit) | 1.02 | 1.02 |
| Background power (pJ/bit) | 0.08 | 0.08 |

ELECTRONIC DEVICE INCLUDING DISPLAY AND METHOD FOR OPERATING SAME

CROSS-REFERENCE TO RELATED APPLICATIONS

This application is a continuation application of International Application No. PCT/KR2023/015310 designating the United States, filed on May 10, 2023, in the Korean Intellectual Property Receiving Office and claiming priority to Korean Patent Application No. 10-2022-0126970, filed on Oct. 5, 2022, and Korean Patent Application No. 10-2022-0145927, filed on Nov. 4, 2022, the disclosures of which are all hereby incorporated by reference herein in their entireties.

BACKGROUND

Technical Field

Certain example embodiments relate to an electronic device including a display and/or a method of operating the same.

Description of Related Art

Displays of electronic devices are developing in the direction of thinner, lighter, more portable, and higher performance as core technology of the information and communication age. For example, an organic light emitting diode (OLED) display has been spotlighted as a flat panel display device that may reduce the weight and volume, which are disadvantages of a cathode ray tube (CRT) display. In the OLED display, a plurality of pixels may be arranged in a matrix form to display an image. Each pixel may include a light emitting element, a plurality of driving elements (e.g., thin film transistors (TFTs)) for independently driving the light emitting element, and at least one storage capacitor.

The contents described above are provided only as background information for helping understanding of embodiments of the disclosure. No determination has been made and no claim has been made as to whether any of the above contents may be applied as the prior art in connection with the disclosure.

SUMMARY

An OLED display may include a plurality of pixels, and each pixel may include an OLED and a pixel driving circuit. The pixel driving circuit may include a plurality of thin film transistors (TFTs) for allowing the OLED to emit light and at least one capacitor cst. Information (e.g., emission data) of the pixel may be stored in a storage capacitor cst, and the storage capacitor cst has a characteristic in which stored charges are leaked over time. In the case that the OLED display is driven at a low frequency e.g., from 1 to 10 Hz, current leakage may occur in the storage capacitor cst. A pixel value (e.g., emission data) may change due to current leakage of the storage capacitor cst. In order to improve the problem caused by current leakage of the storage capacitor cst, the storage capacitor cst may be additionally disposed or the magnitude of the storage capacitor cst may be increased (e.g., the capacity thereof may be increased). However, there may be a limit to increase the magnitude of the storage capacitor cst due to space constraints of the display.

According to an example embodiment, a storage capacitor may be replaced with a display storage (e.g., phase change memory (PCM)) having a non-volatile characteristic. An electronic device and/or a method of operating the same that can store emission data (e.g., data voltage) of each pixel of an OLED display in the display storage (e.g., PCM) may be provided.

According to an example embodiment, emission data (e.g., data voltage) of each pixel of an OLED display may be stored in a display storage (e.g., PCM). Thereby, an electronic device and a method of operating the same that can maintain or substantially maintain a data voltage of each pixel during one frame and/or a plurality of frames regardless of a driving frequency of the OLED display may be provided.

According to an example embodiment, an electronic device and/or a method of operating the same that can allow and/or permit an OLED to emit light with a desired grayscale even on a static screen driving an OLED display at a low scan rate such as 1 Hz may be provided.

According to an example embodiment, an electronic device and/or a method of operating the same that can reduce power consumption by skipping a continuous write operation of a data voltage when operating an OLED display at a low scan rate or displaying a fixed screen may be provided.

According to an example embodiment, an electronic device and/or a method of operating the same that can reduce a delay when storing (e.g., writing) and loading (e.g., reading) data (data voltage information) by simultaneously performing an operation of storing (e.g., writing) emission data (e.g., data voltage information) in a first pixel P1 and an operation of loading (e.g., reading) emission data (e.g., data voltage information) stored in a second pixel P2 may be provided.

Technical problems to be achieved in this document are not limited to the above-described technical problems, other technical problems not described will be clearly understood by those skilled in the art to which this document belongs from the description below.

According to an example embodiment, an electronic device may include a display in which a plurality of pixels are disposed; a display storage in which a plurality of pixel memories are disposed to store data voltage information for enabling the plurality of pixels to emit light; a display driver for operating the display and the display storage; a processor for controlling an operation of the display driver; and a memory operatively connected, directly or indirectly, to the processor. The memory may include instructions that cause the processor, when executed, to store the data voltage information in the display storage during a frame period and to load the stored data voltage information.

According to an example embodiment, in a method of operating an electronic device, data voltage information for allowing organic light emitting diodes (OLEDs) disposed in a plurality of pixels to emit light can be stored in a display storage disposed in a display during a frame period. During the a frame period, the data voltage information stored in the display storage may be loaded. OLEDs disposed in a plurality of pixels with different grayscales in the data voltage information may emit light.

According to an example embodiment, an electronic device and a method of operating the same can store data voltages of each pixel of an OLED display in a display storage (e.g., phase change memory (PCM)) by replacing a storage capacitor with a display storage (e.g., PCM) having a non-volatile characteristic. By storing data voltages of each pixel of the OLED display in the display storage (e.g., PCM), the data voltages of each pixel can be maintained during one frame and/or a plurality of frames regardless of a driving frequency of the OLED display. Thereby, even on a static screen driving the OLED display at a low scan rate such as 1 Hz, the OLED can emit light with a desired grayscale. Further, when the OLED display operates at a low scan rate or displays a fixed screen, by skipping a continuous write operation of a data voltage, power consumption can be reduced.

According to an example embodiment, an electronic device and/or a method of operating the same may simultaneously perform an operation of storing (e.g., writing) data (data voltage information) in a first pixel P1 and an operation of loading (e.g., reading) data (data voltage information) stored in a second pixel P2. Thereby, when storing (e.g., writing) and loading (e.g., reading) data (data voltage information) in a display storage, a delay can be reduced.

According to an example embodiment, an electronic device and/or a method of operating the same may store (e.g., write) data (data voltage information) in a first pixel P1, then store (e.g., write) the data (data voltage information) in pixels of a certain number of gate lines, and then load (e.g., read) the data (data voltage information) stored in the first pixel P1. Thereby, a delay according to storing (e.g., writing) and loading (e.g., reading) data (data voltage information) for the same pixel can be reduced.

In the case that an OLED display including a display storage according to an example embodiment is applied to a virtual reality (VR) device and/or an augmented reality (AR) device, an influence of motion to photon latency (MTP) can be reduced.

Effects that can be obtained from the disclosure are not limited to the above-described effects, and other effects not described will be clearly understood by those of ordinary skill in the art to which the disclosure belongs from the description below.

BRIEF DESCRIPTION OF DRAWINGS

In relation to the description of the drawings, identical or similar reference numerals may be used for identical or similar components.

FIG. 19 is a diagram illustrating a difference in operating speed of a display storage (PCM) and a dynamic random access memory (DRAM) according to an example embodiment.

It should be noted that throughout the drawings, the same reference numbers are used for describing identical or similar elements, features and structures.

DETAILED DESCRIPTION

The following description, with reference to the accompanying drawings, is provided to facilitate comprehensive understanding of various example embodiments of the disclosure. The disclosure includes various specific details for facilitating understanding, but should be regarded as illustrative only. Accordingly, those skilled in the art will recognize that various changes and modifications may be made to various embodiments described in this specification without departing from the scope and spirit of the disclosure. Further, for clarity and conciseness, descriptions of well-known functions and constitutions may be omitted.

Terms and words used in the following description and claims are not limited to meanings in the literature, but are merely used by the applicant to enable clear and consistent understanding of this document. Accordingly, it should be clear to those skilled in the art that the following description of various embodiments of this document is provided for illustrative purposes only and not to limit this document as defined by the appended claims and equivalents thereof.

It should be understood that the singular form includes a plurality of indication targets unless the context clearly dictates otherwise. Accordingly, for example, a reference to a "component surface" may include a reference to one or more of such surfaces.

Figure 1:
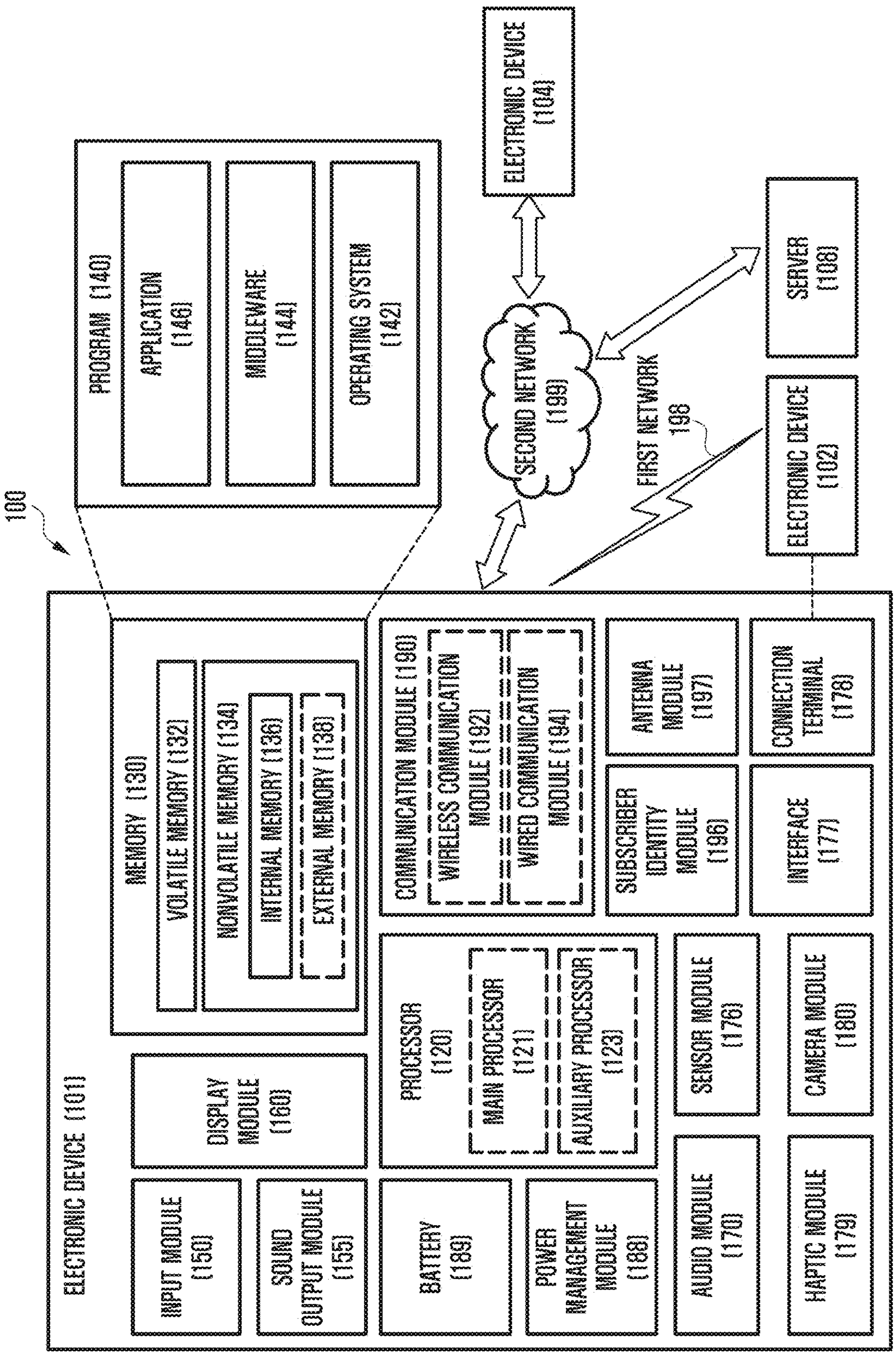
FIG. 1 is a block diagram illustrating an electronic device within a network environment according to an example embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190 comprising communication circuitry, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, although it is described that the display module 160 illustrated in FIG. 1 includes a foldable display or a flexible display, the disclosure is not limited thereto. The display module 160 may include a bar type or plate type display (e.g., organic light emitting diode (OLED) display.

According to an embodiment, the display module 160 illustrated in FIG. 1 may include a flexible display (e.g., flexible OLED display) constituted to be foldable or unfoldable a screen (e.g., display screen).

According to an embodiment, the display module 160 illustrated in FIG. 1 may include a flexible display (e.g., flexible OLED display) disposed to be slidable to provide a screen (e.g., display screen).

Figure 2A:
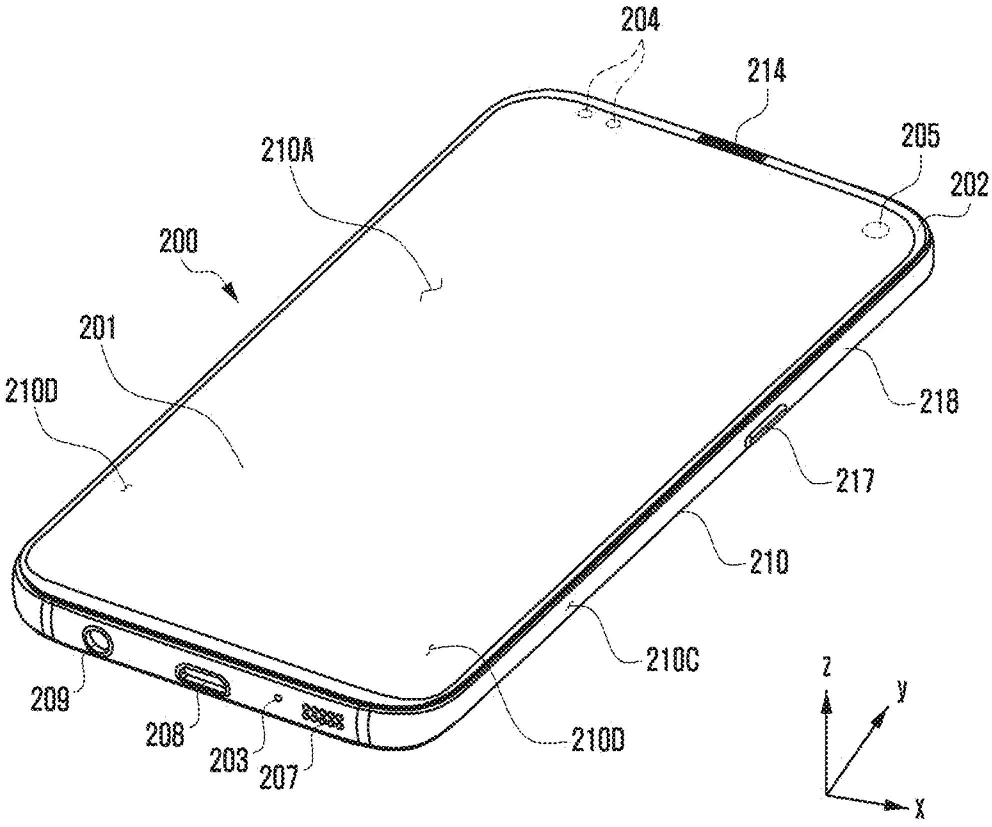
FIG. 2A is a perspective view illustrating a front surface of an electronic device according to an example embodiment.
Figure 2B:
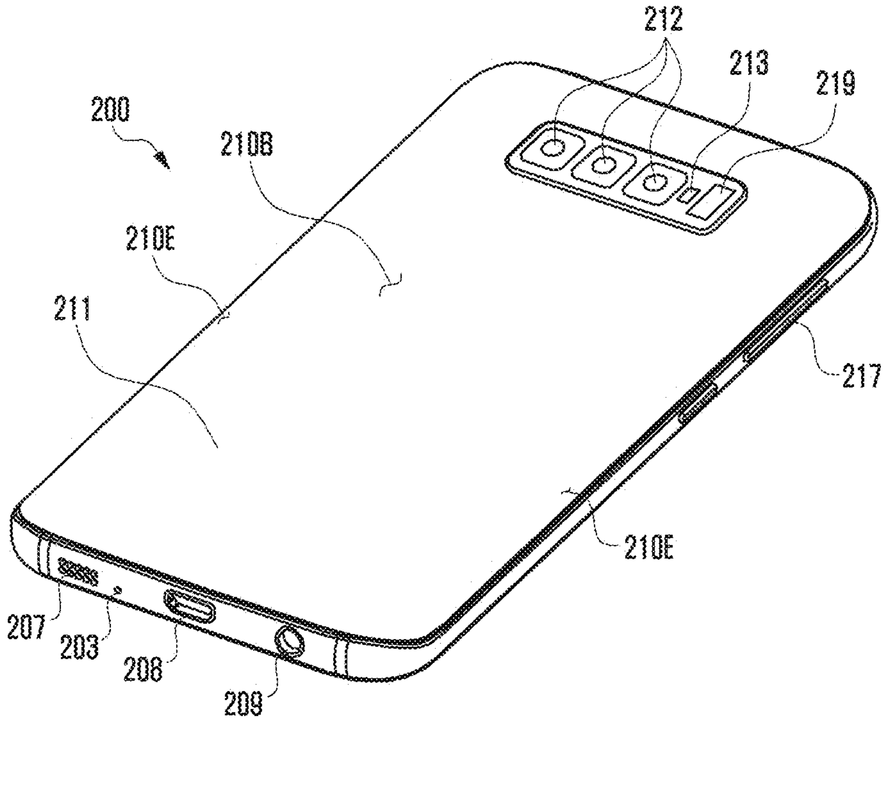
FIG. 2B is a perspective view illustrating a rear surface of an electronic device according to an example embodiment.

FIG. 2A is a perspective view illustrating a front surface of an electronic device according to an example embodiment. FIG. 2B is a perspective view illustrating a rear surface of an electronic device according to an example embodiment.

With reference to FIGS. 2A and 2B, an electronic device 200 (e.g., the electronic device 101 of FIG. 1) according to an example embodiment may include a first surface (or front surface) 210A, a second surface (or rear surface) 210B, and a housing 210. A display 201 (e.g., a display 320 of FIG. 3A, a display 410 of FIG. 4, a display 410 of FIG. 5) may be disposed in a space formed by the housing 210. The housing 210 may include a side surface 210C enclosing a space between the first surface 210A and the second surface 210B. According to an embodiment, the housing 210 may refer to a structure that forms a portion of the first surface 210A, the second surface 210B, and the side surface 210C.

Figure 10:
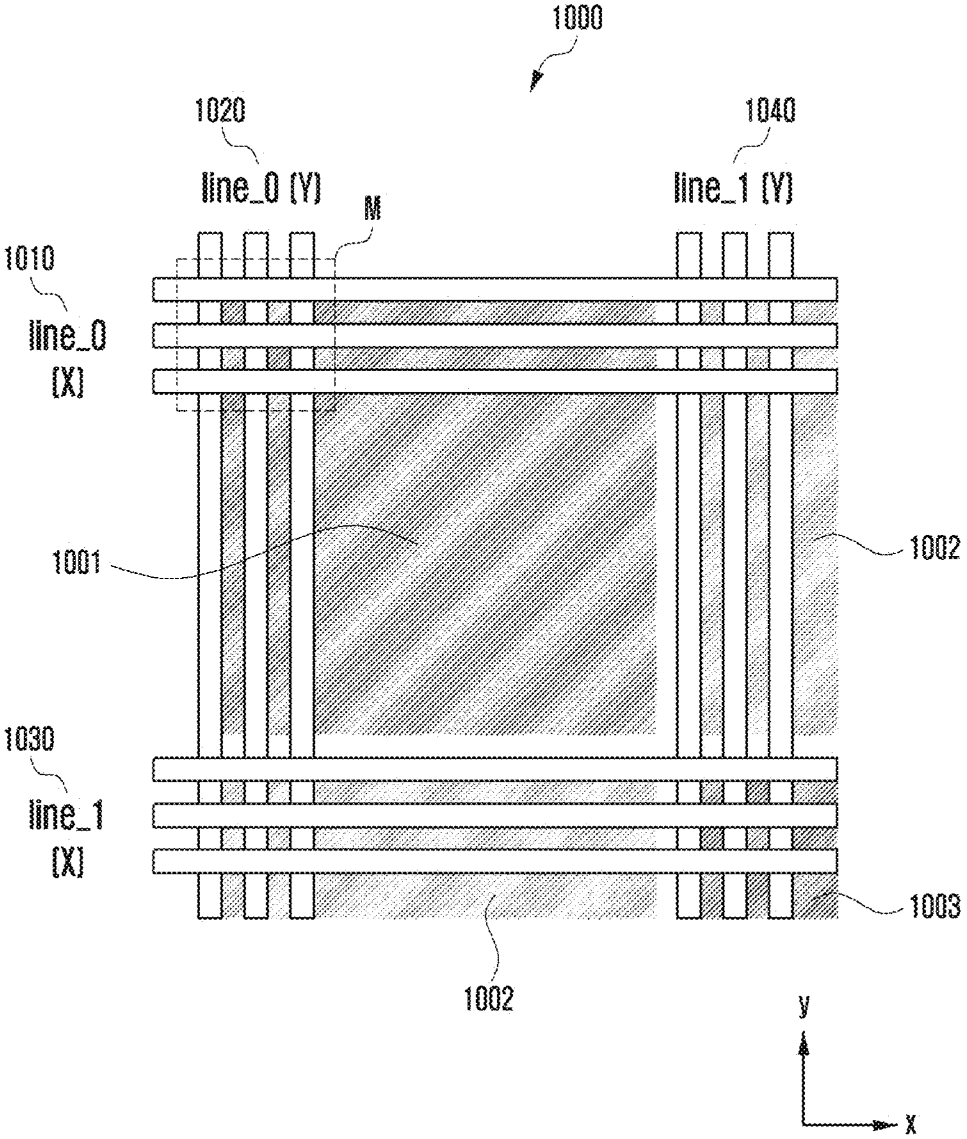
FIG. 10 is a diagram illustrating a display storage (e.g., phase change memory (PCM)) disposed in a display according to an example embodiment.
Figure 12:
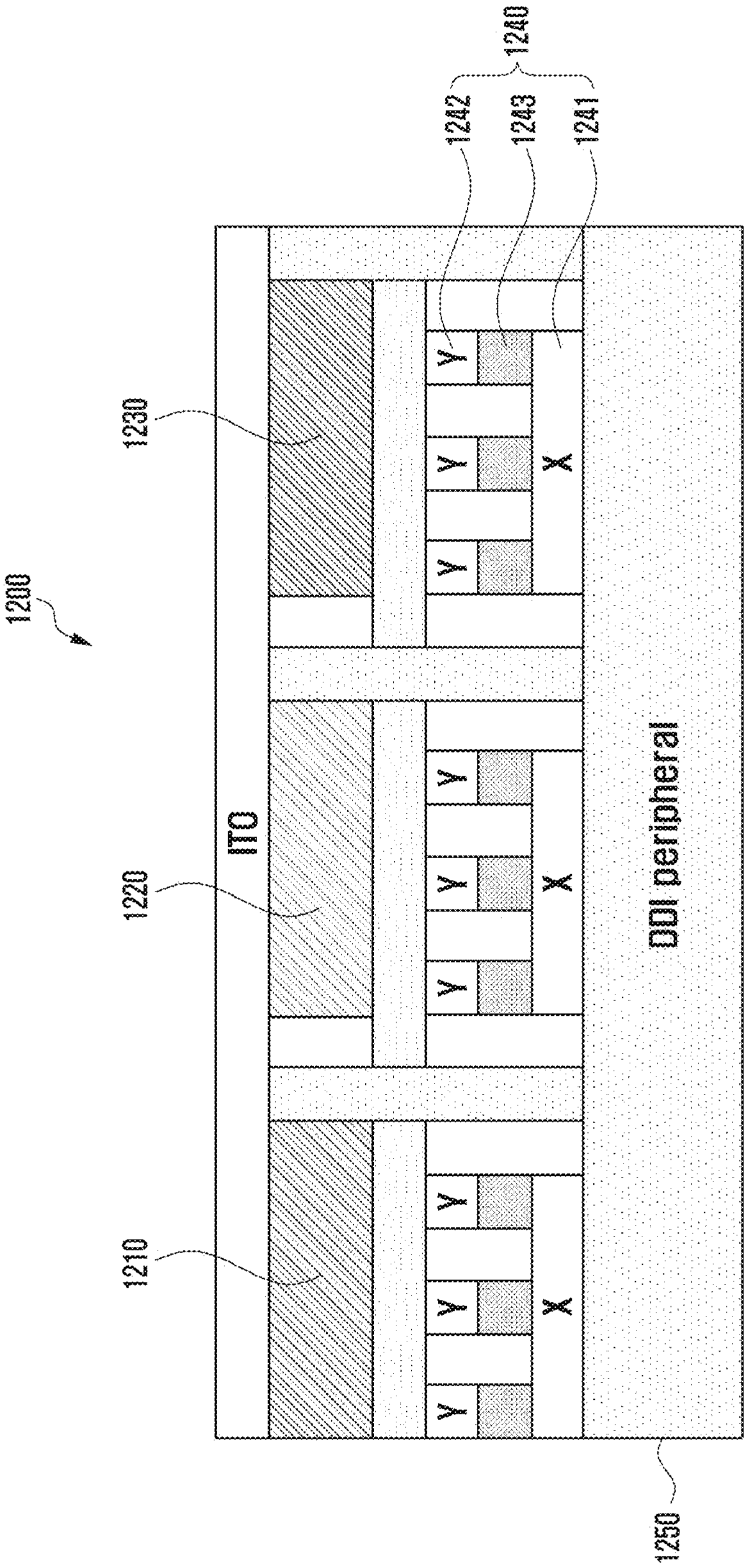
FIG. 12 is a block diagram illustrating a display storage (e.g., PCM) according to an example embodiment.

According to an embodiment, the electronic device 200 according to an example embodiment may include a display storage (e.g., a display storage 1000 of FIG. 10 and a display storage 1200 of FIG. 12). By replacing storage capacitors (e.g., storage capacitors cst1 and cst2 of FIG. 6) of an OLED display with the display storages 1000 and 1200, data voltage information of each pixel of the OLED display may be stored in the display storages 1000 and 1200. The display storages 1000 and 1200 may have a non-volatile characteristic and maintain data voltage information of each pixel during one frame and/or a plurality of frames regardless of a driving frequency of the OLED display.

According to an embodiment, the first surface 210A may be formed by a front plate 202 (e.g., a glass plate or a polymer plate including various coating layers) whose at least a portion is substantially transparent.

According to an embodiment, the second surface 210B may be formed by a substantially opaque rear plate 211. The rear plate 211 may be made of, for example, coated or colored glass, ceramic, polymer, metal (e.g., aluminum, stainless steel (STS), or magnesium), or a combination of at least two of the above materials. However, the disclosure is not limited thereto, and the rear plate 211 may be made of transparent glass.

According to an embodiment, the side surface 210C may be coupled to the front plate 202 and the rear plate 211 and be formed by a side bezel structure 218 (or "lateral member") including metal and/or polymer. According to an embodiment, the rear plate 211 and the side bezel structure 218 may be integrally formed and include the same material (e.g., metal material such as aluminum).

According to an embodiment, the front plate 202 may include two first areas 210D that are curved from the first surface 210A toward the rear plate 211 to be extended seamlessly. Two first areas 210D may be disposed at both ends of a long edge of the front plate 202.

According to an embodiment, the rear plate 211 may include two second areas 210E that are curved from the second surface 210B toward the front plate 202 to be extended seamlessly.

According to an embodiment, the front plate 202 (or the rear plate 211) may include only one of the first areas 210D (or the second areas 210E). According to an embodiment, some of the first areas 210D or the second areas 210E may not be included. In embodiments, when viewed from the side surface of the electronic device 200, the side bezel structure 218 may have a first thickness (or width) at the side surface that does not include the first areas 210D or the second areas 210E, and have a second thickness smaller than the first thickness at the side surface including the first areas 210D or the second areas 210E.

According to an embodiment, the electronic device 200 may include at least one of a display 201 (e.g., the display module 160 of FIG. 1, the display module 160 of FIG. 4, the display module 160 of FIG. 5), a sound input device 203 (e.g., the input module 150 of FIG. 1), sound output devices 207 and 214 (e.g., the sound output module 155 of FIG. 1), sensor modules 204 and 219 (e.g., the sensor module 176 of FIG. 1), camera modules 205 and 212 (e.g., the camera module 180 of FIG. 1), a flash 213, a key input device 217, an indicator (not illustrated), or connectors 208 and 209. According to an embodiment, the electronic device 200 may omit at least one (e.g., the key input device 217) of the components or may additionally include another component.

According to an embodiment, the display 201 (e.g., the display 320 of FIG. 3A, the display 410 of FIG. 4, the display 410 of FIG. 5) may be visually visible through an upper end portion of the front plate 202. For example, the display 210 may include an OLED display.

According to an embodiment, at least a portion of the display 201 may be visible through the front plate 202 forming the first area 210D of the first surface 210A and the side surface 210C. The display 201 may be coupled with or disposed adjacent to a touch sensing circuit, a pressure sensor capable of measuring the intensity (pressure) of a touch, and/or a digitizer detecting a stylus pen of a magnetic field type. According to an embodiment, at least a portion of the sensor modules 204 and 219, and/or at least a portion of the key input device 217 may be disposed in the first area 210D and/or the second area 210E.

According to an embodiment, at a rear surface of a screen display area of the display 201, at least one of the sensor module 204, the camera module 205 (e.g., image sensor), the audio module 214, or the fingerprint sensor may be disposed.

According to an embodiment, the display 201 may be coupled with or disposed adjacent to a touch sensing circuit, a pressure sensor capable of measuring the intensity (pressure) of a touch, and/or a digitizer detecting a magnetic field type stylus pen.

According to an embodiment, at least a portion of the sensor modules 204 and 219, and/or at least a portion of the key input device 217 may be disposed in the first areas 210D and/or the second areas 210E.

According to an embodiment, the sound input device 203 may include a microphone. According to an embodiment, the input device 203 may include a plurality of microphones disposed to detect a direction of sound. The sound output devices 207 and 214 may include an external speaker 207 and a call receiver (e.g., an audio module 214). In some embodiments, the sound input device 203 (e.g., microphone), the sound output devices 207 and 214, and the connectors 208 and 209 may be disposed in an inner space of the electronic device 200 and be exposed to an external environment through at least one hole formed in the housing 210. In some embodiments, the hole formed in the housing 210 may be commonly used for the sound input device 203 (e.g., microphone) and the sound output devices 207 and 214. In some embodiments, the sound output devices 207 and 214 may include speakers (e.g., piezo speakers) that operate without the hole formed in the housing 210.

According to an embodiment, the sensor modules 204 and 219 (e.g., the sensor module 176 of FIG. 1) may generate electrical signals or data values corresponding to an internal operating state or an external environmental state of the electronic device 200. The sensor modules 204 and 219 may include, for example, a first sensor module 204 (e.g., proximity sensor) disposed at the first surface 210A of the housing 210, a second sensor module 219 (e.g., HRM sensor) disposed at the second surface 210B of the housing 210, and/or a third sensor module (not illustrated) (e.g., fingerprint sensor). For example, the fingerprint sensor may be disposed at the first surface 210A (e.g., the display 201) and/or the second surface 210B of the housing 210. The electronic device 200 may further include at least one of a sensor module not illustrated, for example, a gesture sensor, a gyro sensor, an atmospheric sensor, a magnetic sensor, an acceleration sensor, a grip sensor, a color sensor, an infrared (IR) sensor, a biometric sensor, a temperature sensor, a humidity sensor, or an illuminance sensor.

According to an embodiment, the camera modules 205 and 212 may include a first camera module 205 disposed at the first surface 210A of the electronic device 200, and a second camera module 212 disposed at the second surface 210B. The flash 213 may be disposed around the camera modules 205 and 212. The camera modules 205 and 212 may include one or more lenses, an image sensor, and/or an image signal processor. The flash 213 may include, for example, a light emitting diode or a xenon lamp.

According to an embodiment, the first camera module 205 may be disposed in a lower part of a display panel of the display 201 in an under display camera (UDC) manner. According to an embodiment, two or more lenses (wide angle and telephoto lenses) and image sensors may be disposed at one surface of the electronic device 200. According to an embodiment, a plurality of first camera modules 205 may be disposed at the first surface (e.g., a surface in which a screen is displayed) of the electronic device 200 in an under display camera (UDC) manner.

According to an embodiment, the key input device 217 may be disposed at the side surface 210C of the housing 210. According to an embodiment, the electronic device 200 may not include some or all of the key input devices 217 described above, and key input devices 217 that are not included may be implemented in other forms such as soft keys on the display 201. According to an embodiment, the key input device 217 may be implemented using a pressure sensor included in the display 201.

According to an embodiment, the connectors 208 and 209 may include a first connector hole 208 that may receive a connector (e.g., USB connector) for transmitting and receiving power and/or data to and from an external electronic device, and/or a second connector hole 209 (or earphone jack) that may receive a connector for transmitting and receiving audio signals to and from the external electronic device. The first connector hole 208 may include a universal serial bus (USB) type A or USB C type port. In the case that the first connector hole 208 supports a USB C type, the electronic device 200 (e.g., the electronic device 101 of FIG. 1) may support USB power delivery (PD) charging.

According to an embodiment, some first camera module 205 of the camera modules 205 and 212 and/or some sensor module 204 of the sensor modules 204 and 219 may be disposed to be visually visible through the display 201.

According to an embodiment, in the case that the first camera module 205 is disposed in an under display camera (UDC) manner, the first camera module 205 may not be visually visible to the outside.

According to an embodiment, the first camera module 205 may be disposed to overlap the display area, and display a screen even in the display area corresponding to the first camera module 205. Some sensor modules 204 may be disposed to perform functions thereof without being visually exposed through the front plate 202 in an internal space of the electronic device.

Figure 3A:
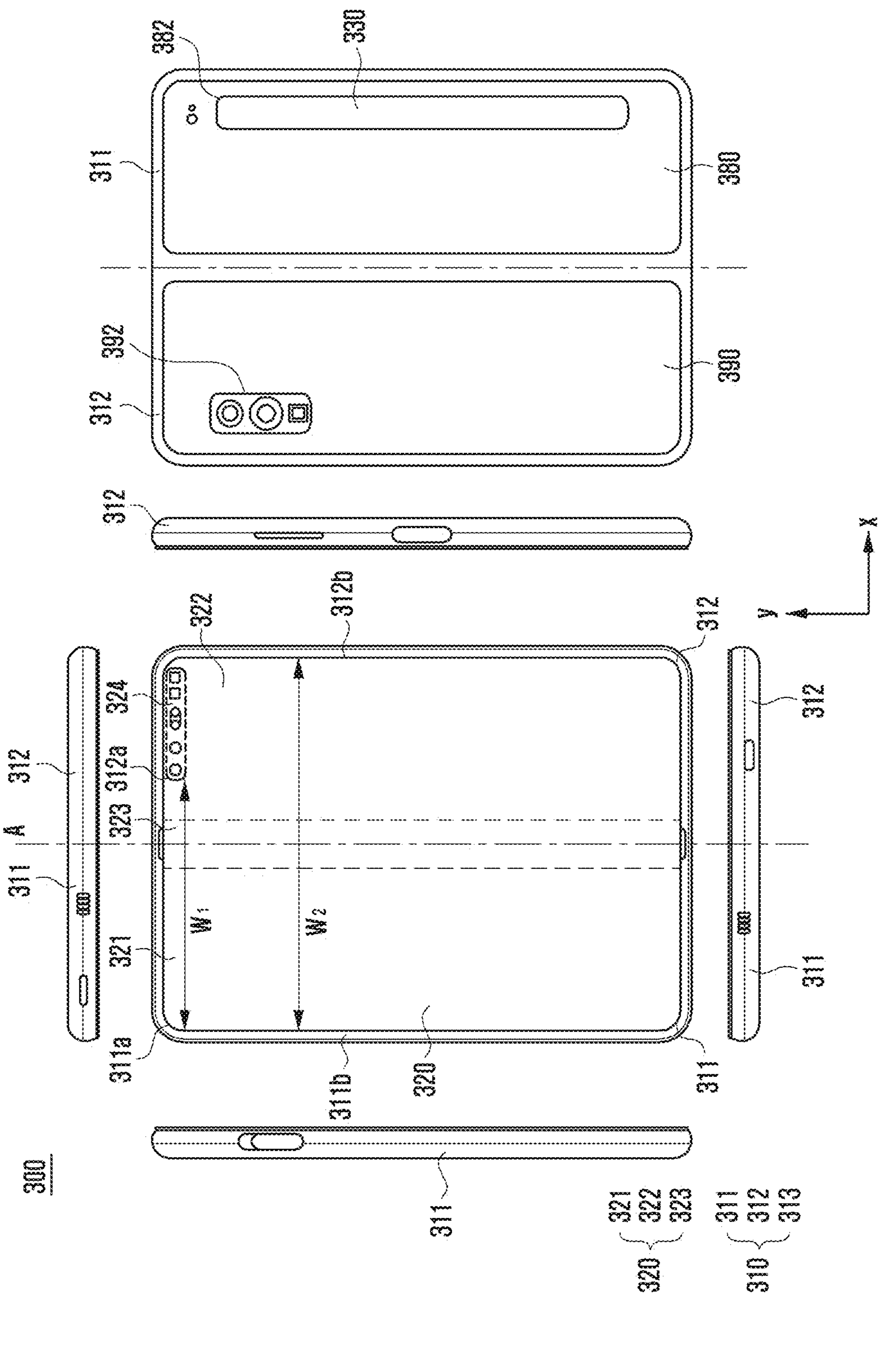
FIG. 3A is a diagram illustrating a first state (e.g., unfolded state, open state) of an electronic device according to an example embodiment.
Figure 3B:
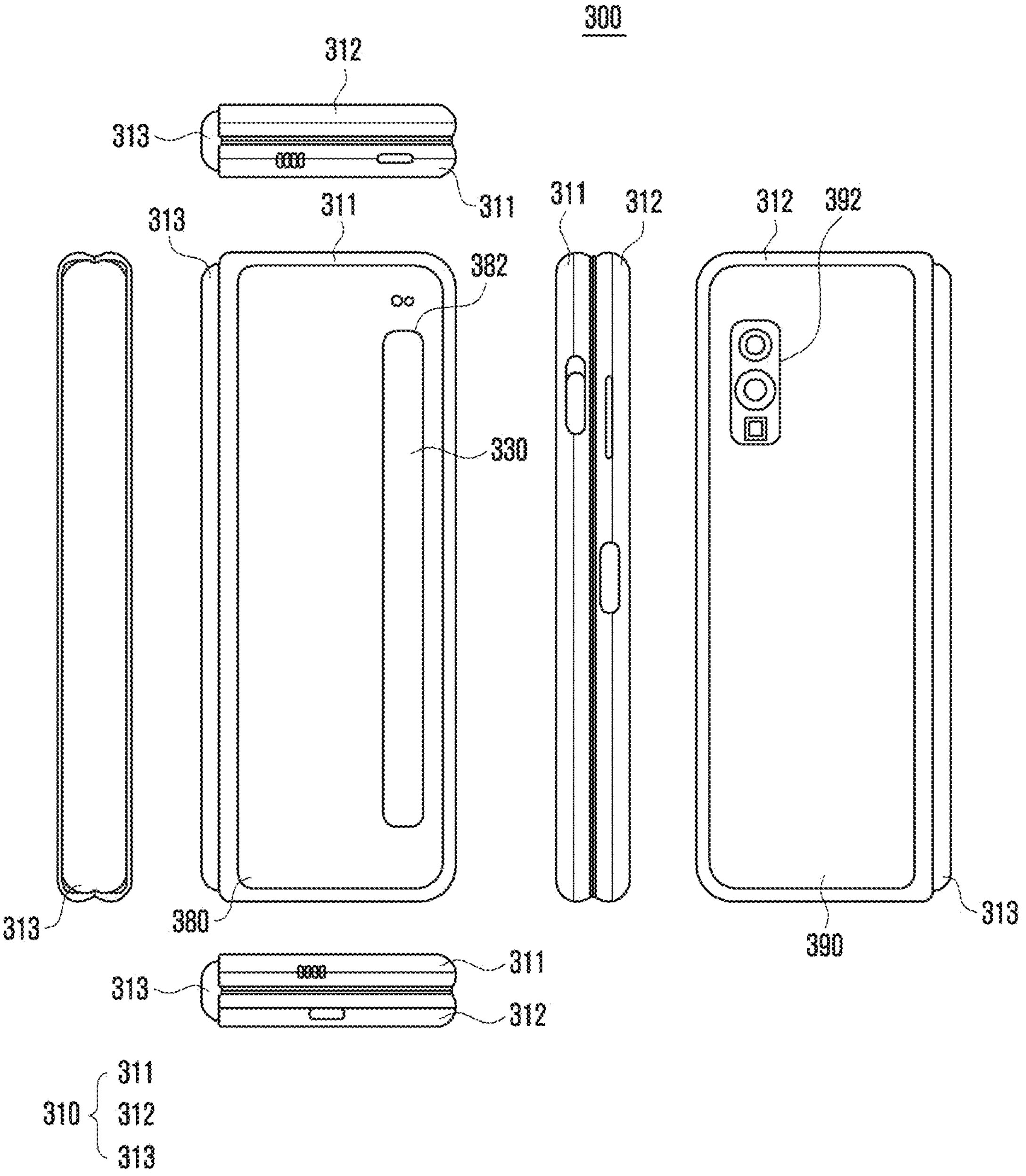
FIG. 3B is a diagram illustrating a second state (e.g., folded state, closed state) of an electronic device according to an example embodiment.

FIG. 3A is a diagram illustrating a first state (e.g., unfolded state, open state) of an electronic device according to an example embodiment. FIG. 3B is a diagram illustrating a second state (e.g., folded state, closed state) of an electronic device according to an example embodiment.

With reference to FIGS. 3A and 3B, an electronic device 300 (e.g., the electronic device 101 of FIG. 1, the electronic device 200 of FIGS. 2A and 2B) may include a housing 310 and a display 320 (e.g., the display 410 of FIG. 4, the display 410 of FIG. 5) supported by the housing 310.

According to an embodiment, the display 320 may include a flexible display or a foldable display. For example, the display 320 may include a flexible OLED display.

According to an embodiment, the electronic device 300 according to an example embodiment may include a display storage (e.g., a display storage 1000 of FIG. 10, a display storage 1200 of FIG. 12). By replacing storage capacitors (e.g., storage capacitors cst1 and cst2 of FIG. 6) of an OLED display with the display storages 1000 and 1200, data voltage information of each pixel of the OLED display may be stored in the display storages 1000 and 1200. The display storages 1000 and 1200 have a non-volatile characteristic and maintain data voltage information of each pixel during one frame and/or a plurality of frames regardless of a driving frequency of the OLED display.

According to an embodiment, a surface in which the display 320 is disposed may be a first surface or a front surface (e.g., a surface in which a screen is displayed when unfolded) of the electronic device 300. A surface opposite to the front surface may be a second surface or a rear surface of the electronic device 300. Further, a surface enclosing a space between the front surface and the rear surface may be a third surface or a side surface of the electronic device 300. For example, in the electronic device 300, a folding area 323 may be folded or unfolded in a first direction (e.g., x-axis direction) based on a folding axis (e.g., A-axis).

According to an embodiment, the housing 310 may include a first housing structure 311, a second housing structure 312 including a sensor area 324, a first rear cover 380, and/or a second rear cover 390. The housing 310 of the electronic device 300 is not limited to the shape and coupling illustrated in FIGS. 3A and 3B, and may be implemented by a combination and/or coupling of other shapes or components.

According to an embodiment, the first housing structure 311 and the first rear cover 380 may be formed integrally, and the second housing structure 312 and the second rear cover 390 may be formed integrally.

According to an embodiment, the first housing structure 311 and the second housing structure 312 may be disposed at both sides about a folding axis A, and have an overall symmetrical shape with respect to the folding axis A. An angle formed between the first housing structure 311 and the second housing structure 312 may vary according to whether the state of the electronic device 300 is a first state (e.g., unfolded state), a second state (e.g., folded state), or a third state (e.g., intermediate state between unfolded and folded).

According to an embodiment, the second housing structure 312 additionally includes the sensor area 324 in which various sensors (e.g., illuminance sensor, iris sensor, and/or image sensor) are disposed, unlike the first housing structure 311, but may have a mutual symmetrical shape in other areas. As another example, the sensor area 324 may be disposed in the first housing structure 311 or may be omitted.

According to an embodiment, at least one sensor (e.g., camera module, illuminance sensor, iris sensor, and/or image sensor) may be disposed in a lower portion and/or a bezel area of the display as well as in the sensor area 324.

According to an embodiment, the first housing structure 311 and the second housing structure 312 may form a recess that receives the display 320. In the illustrated embodiment, due to the sensor area 324, the recess may have two or more different widths in a direction (e.g., x-axis direction) orthogonal to the folding axis A.

For example, the recess may have a first width W1 between a first portion 311*a* of the first housing structure 311 and a first portion 312*a* of the second housing structure 312 formed at an edge of the sensor area 324 of the second housing structure 312. The recess may have a second width W2 formed by a second portion 311*b* of the first housing structure 311 substantially parallel to the folding axis A of the first housing structure 311 and a second portion 312*b* of the second housing structure 312 substantially parallel to the folding axis A while not corresponding to the sensor area 324 of the second housing structure 312. In this case, the second width W2 may be formed longer than the first width W1. In other words, the first portion 311*a* of the first housing structure 311 and the first portion 312*a* of the second housing structure 312 having mutually asymmetrical shapes may form a first width W1 of the recess. The second portion 311*b* of the first housing structure 311 and the second portion 312*b* of the second housing structure 312 having mutually symmetrical shapes may form a second width W2 of the recess.

According to an embodiment, the first portion 312*a* and the second portion 312*b* of the second housing structure 312 may have different distances from the folding axis A. The width of the recess is not limited to the illustrated example. In various embodiments, the recess may have a plurality of widths due to a shape of the sensor area 324 or a portion having an asymmetrical shape of the first housing structure 311 and the second housing structure 312.

According to an embodiment, at least a portion of the first housing structure 311 and the second housing structure 312 may be made of a metallic or non-metallic material having a rigidity of a selected magnitude so as to support the display 320.

According to an embodiment, the sensor area 324 may be formed to have a predetermined area adjacent to one corner of the second housing structure 312. However, the disposition, shape, and size of the sensor area 324 are not limited to the illustrated example. For example, the sensor area 324 may be provided in another corner of the second housing structure 312 or in any area between an upper end corner and a lower end corner.

According to an embodiment, components for performing various functions built into the electronic device 300 may be exposed at the front surface of the electronic device 300 through the sensor area 324 or through one or more openings provided in the sensor area 324. In various embodiments, the components may include various types of sensors. The sensors may include, for example, at least one of an illuminance sensor, a front camera (e.g., camera module), a receiver, or a proximity sensor.

According to an embodiment, the first rear cover 380 may be disposed at one side of the folding axis A at the rear surface of the electronic device 300 and have, for example, a substantially rectangular periphery, and have the periphery wrapped by the first housing structure 311. As another example, the second rear cover 390 may be disposed at the other side of the folding axis A of the rear surface of the electronic device and have the periphery wrapped by the second housing structure 312.

According to an embodiment, the first rear cover 380 and the second rear cover 390 may have substantially symmetrical shapes about the folding axis A. However, the first rear cover 380 and the second rear cover 390 do not necessarily have mutually symmetrical shapes, and according to an embodiment, the electronic device 300 may include the first rear cover 380 and the second rear cover 390 of various shapes. According to another embodiment, the first rear cover 380 may be formed integrally with the first housing structure 311, and the second rear cover 390 may be formed integrally with the second housing structure 312.

According to an embodiment, the first rear cover 380, the second rear cover 390, the first housing structure 311, and the second housing structure 312 may form a space in which various components (e.g., printed circuit board or battery) of the electronic device 300 may be disposed. According to an embodiment, one or more components may be disposed or visually exposed at the rear surface of the electronic device 300. For example, at least a portion of a sub-display 330 may be visually exposed through a first rear area 382 of the first rear cover 380. According to an embodiment, one or more components or sensors may be visually exposed through a second rear area 392 of the second rear cover 390. In various embodiments, the sensors may include an illuminance sensor, a proximity sensor, and/or a rear camera.

According to an embodiment, a hinge cover 313 may be constituted to be disposed between the first housing structure 311 and the second housing structure 312 to cover an internal component (e.g., hinge structure). The hinge cover 313 may cover a portion in which the first housing structure 311 and the second housing structure 312 come into contact with each other when the electronic device 300 is unfolded and folded.

According to an embodiment, the hinge cover 313 may be covered by a part of the first housing structure 311 and the second housing structure 312 or may be exposed to the outside according to the first state (e.g., unfolded state) or the second state (e.g., folded state) of the electronic device 300. According to an embodiment, in the case that the electronic device 300 is in the first state (e.g., unfolded state), the hinge cover 313 may be covered by the first housing structure 311 and the second housing structure 312 not to be exposed.

According to an embodiment, in the case that the electronic device 300 is in a second state (e.g., folded state) (e.g., fully folded state), the hinge cover 313 may be exposed to the outside between the first housing structure 311 and the second housing structure 312. According to an embodiment, in the case that the first housing structure 311 and the second housing structure 312 are in a third state (e.g., intermediate state) in which the first housing structure 311 and the second housing structure 312 are folded with a certain angle, the hinge cover 313 may be partially exposed to the outside between the first housing structure 311 and the second housing structure 312. However, in this case, the exposed area may be smaller than that in the fully folded state. According to an embodiment, the hinge cover 313 may include a curved surface.

According to an embodiment, the display 320 may be disposed on a space formed by the housing 310. The display 320 may be disposed to be supported by the housing 310. For example, the display 320 may be received on a recess formed by the housing 310 and form most of the front surface of the electronic device 300.

According to an embodiment, the front surface of the electronic device 300 may include a display 320, a partial area of a first housing structure 311 adjacent to the display 320, and a partial area of a second housing structure 312. The rear surface of the electronic device 300 may include a first rear cover 380, a partial area of the first housing structure 311 adjacent to the first rear cover 380, a second rear cover 390, and a partial area of the second housing structure 312 adjacent to the second rear cover 390.

According to an embodiment, the display 320 may indicate a display whose at least a partial area may be transformed into a flat surface or a curved surface. According to an embodiment, the display 320 may include a folding area 323, a first area 321 disposed at one side (e.g., the left side in FIG. 3A) based on the folding area 323, and a second area 322 disposed at the other side (e.g., the right side in FIG. 3A).

According to an embodiment, the display 320 may include an OLED display of a top emission or bottom emission type. The OLED display may include a polarizing film (or polarizing layer), window glass (e.g., ultra-thin glass (UTG) or polymer window), and/or an optical compensation film (OCF). Here, the OLED display may include a low temperature color filter (LTCF) layer, and the LTCF layer may replace a polarizing film (or polarizing layer).

The division of areas of the display 320 is exemplary, and the display 320 may be divided into a plurality (e.g., two or more) of areas according to the structure or function. According to an embodiment, areas of the display 320 may be divided by the folding axis A or the folding area 323 extended parallel to the y-axis, but in an embodiment, areas of the display 320 may be divided based on another folding area (e.g., a folding area parallel to the x-axis) or another folding axis (e.g., a folding axis parallel to the x-axis). “Based on” as used herein covers based at least on.

According to an embodiment, the first area 321 and the second area 322 may have an overall symmetrical shape about the folding area 323.

Hereinafter, the operation of the first housing structure 311 and the second housing structure 312 and each area of the display 320 according to the state (e.g., flat state and folded state) of the electronic device 300 will be described.

According to an embodiment, in the case that the electronic device 300 is in a flat state (e.g., FIG. 3A), the first housing structure 311 and the second housing structure 312 may be disposed to form an angle of approximately 180 degrees and face substantially the same direction. A surface of the first area 321 and a surface of the second area 322 of the display 320 may form an angle of about 180 degrees with respect to each other and face substantially the same direction (e.g., the front direction of the electronic device). The folding area 323 may form substantially the same plane as that of the first area 321 and the second area 322.

According to an embodiment, in the case that the electronic device 300 is in a folded state (e.g., FIG. 3B), the first housing structure 311 and the second housing structure 312 may be disposed to face each other. A surface of the first area 321 and a surface of the second area 322 of the display 320 may form a narrow angle (e.g., between about 0 degree and about 10 degrees) with each other and face each other. At least a portion of the folding area 323 may be formed in a curved surface having a predetermined curvature.

According to an embodiment, in the case that the electronic device 300 is in an intermediate state (half folded state), the first housing structure 311 and the second housing structure 312 may be disposed at a certain angle with each other. The surface of the first area 321 and the surface of the second area 322 of the display 320 may form an angle larger than the folded state and smaller than the unfolded state. The folding area 323 may be formed in a curved surface whose at least a portion has a predetermined curvature, and the curvature in this case may be smaller than that in the folded state.

An electronic device according to an example embodiment may include an electronic device such as a bar type, a foldable type, a rollable type, a sliding type, a wearable type, a tablet PC, and/or a notebook PC. An electronic device according to an example embodiment is not limited to the examples described above, and may include various other electronic devices.

Figure 4:
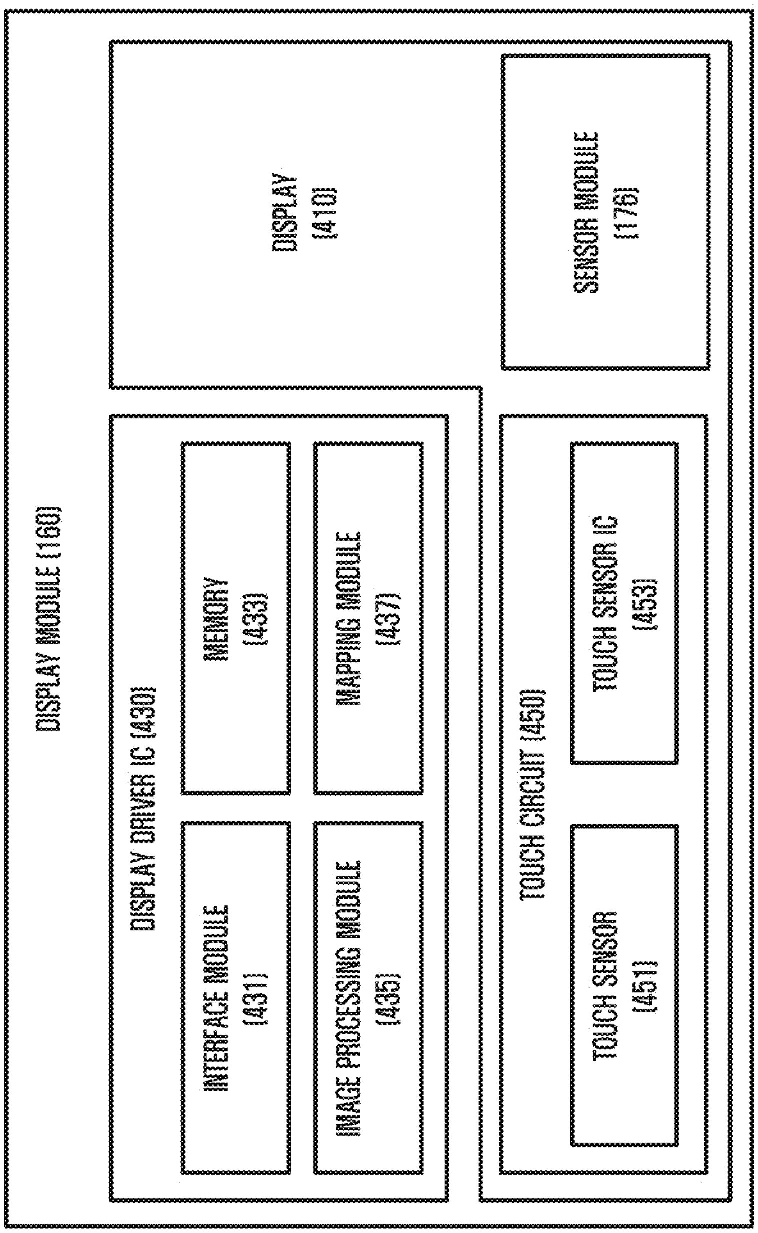
FIG. 4 is a block diagram illustrating a display module according to an example embodiment.

FIG. 4 is a block diagram illustrating a display module 160 according to an example embodiment.

With reference to FIG. 4, the display module 160 (e.g., the display module 160 of FIG. 1) may include a display 410 (e.g., the display 201 of FIG. 2A, the display 320 of FIG. 3A), and a display driver IC (e.g., display driving circuit) (hereinafter, referred to as “DDI”) 430 for driving the display 410.

According to an embodiment, the display module 160 according to an example embodiment may include a display storage (e.g., a display storage 1000 of FIG. 10, a display storage 1200 of FIG. 12). By replacing storage capacitors of an OLED display with the display storages 1000 and 1200, data voltage information of each pixel of the OLED display may be stored in the display storages 1000 and 1200. The display storages 1000 and 1200 may have a non-volatile characteristic and maintain data voltage information of each pixel during one frame and/or a plurality of frames regardless of a driving frequency of the OLED display.

According to an embodiment, the DDI 430 may include an interface module 431 comprising interface circuitry, a memory 433 (e.g., buffer memory), an image processing module 435 comprising processing circuitry, or a mapping module 437 comprising circuitry.

According to an embodiment, the DDI 430 may receive image data or image information including an image control signal corresponding to a command for controlling the image data from another component of the electronic device (e.g., the electronic device 101 of FIG. 1, the electronic device 200 of FIGS. 2A and 2B) through an interface module 431.

According to an embodiment, the image information may be received from the processor (e.g., the processor 120 of FIG. 1) (e.g., the main processor 121 of FIG. 1) (e.g., application processor) or an auxiliary processor (e.g., the auxiliary processor 123 of FIG. 1) (e.g., graphics processing unit) that operates independently of a function of the main processor 121. Each "processor" herein includes processing circuitry, and/or may include multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment, the DDI 430 may communicate with a touch circuit 450 or the sensor module 176 through the interface module 431. Further, the DDI 430 may store at least some of the received image information in the memory 433. As an example, the DDI 430 may store at least some of the received image information in the memory 433 in units of a frame.

According to an embodiment, the image processing module 435, comprising processing circuitry, may perform preprocessing or postprocessing (e.g., resolution, brightness, or size adjustment) on at least a portion of the image data based at least on characteristics of the image data or characteristics of the display 410.

According to an embodiment, the mapping module 437 may generate a voltage value or a current value corresponding to the image data pre-processed or post-processed through the image processing module 435. According to an embodiment, the generation of the voltage value or the current value may be performed based at least a portion on, for example, properties of pixels (e.g., arrangement of pixels (RGB stripe or pentile structure), or a size of each sub-pixel) of the display 410.

According to an embodiment, the display 410 may include an OLED display or a flexible OLED display. At least some pixels of the display 410 may be driven based at least a portion on, for example, the voltage value or the current value. Thereby, visual information (e.g., text, image, or icon) corresponding to the image data may be displayed through the display 410.

According to an embodiment, the display module 160, comprising a display, may further include a touch circuit 450. The touch circuit 450 may include a touch sensor 451 and a touch sensor IC 453 for controlling the touch sensor 451.

According to an embodiment, the touch sensor IC 453 may control the touch sensor 451 to detect a touch input or a hovering input for a specific location of the display 410. For example, the touch sensor IC 453 may measure a change in a signal (e.g., voltage, light amount, resistance, or charge amount) for a specific location of the display 410, thereby detecting a touch input or a hovering input. The touch sensor IC 453 may provide information (e.g., location, area, pressure, or time) on the detected touch input or hovering input to the processor (e.g., the processor 120 of FIG. 1).

According to an embodiment, at least a portion (e.g., the touch sensor IC 453) of the touch circuit 450 may be included as part of the DDI 430 or the display 410.

According to an embodiment, at least a portion (e.g., the touch sensor IC 453) of the touch circuit 450 may be included as part of another component (e.g., the auxiliary processor 123) disposed outside the display module 160.

According to an embodiment, the display module 160 may further include at least one sensor (e.g., fingerprint sensor, iris sensor, pressure sensor, or illuminance sensor) of the sensor module 176, or a control circuit therefor. In this case, the at least one sensor or the control circuit therefor may be embedded in a part (e.g., the display 410 or the DDI 430) of the display module 160 or a part of the touch circuit 450. For example, in the case that the sensor module 176 embedded in the display module 160 includes a biometric sensor (e.g., fingerprint sensor), the biometric sensor may acquire biometric information (e.g., fingerprint image) associated with a touch input through a partial area of the display 410. As another example, in the case that the sensor module 176 embedded in the display module 160 includes a pressure sensor, the pressure sensor may acquire pressure information associated with a touch input through a partial area or the entire area of the display 410. According to an embodiment, the touch sensor 451 or the sensor module 176 may be disposed between pixels of a pixel layer of the display 410, or over or under the pixel layer.

Figure 5:
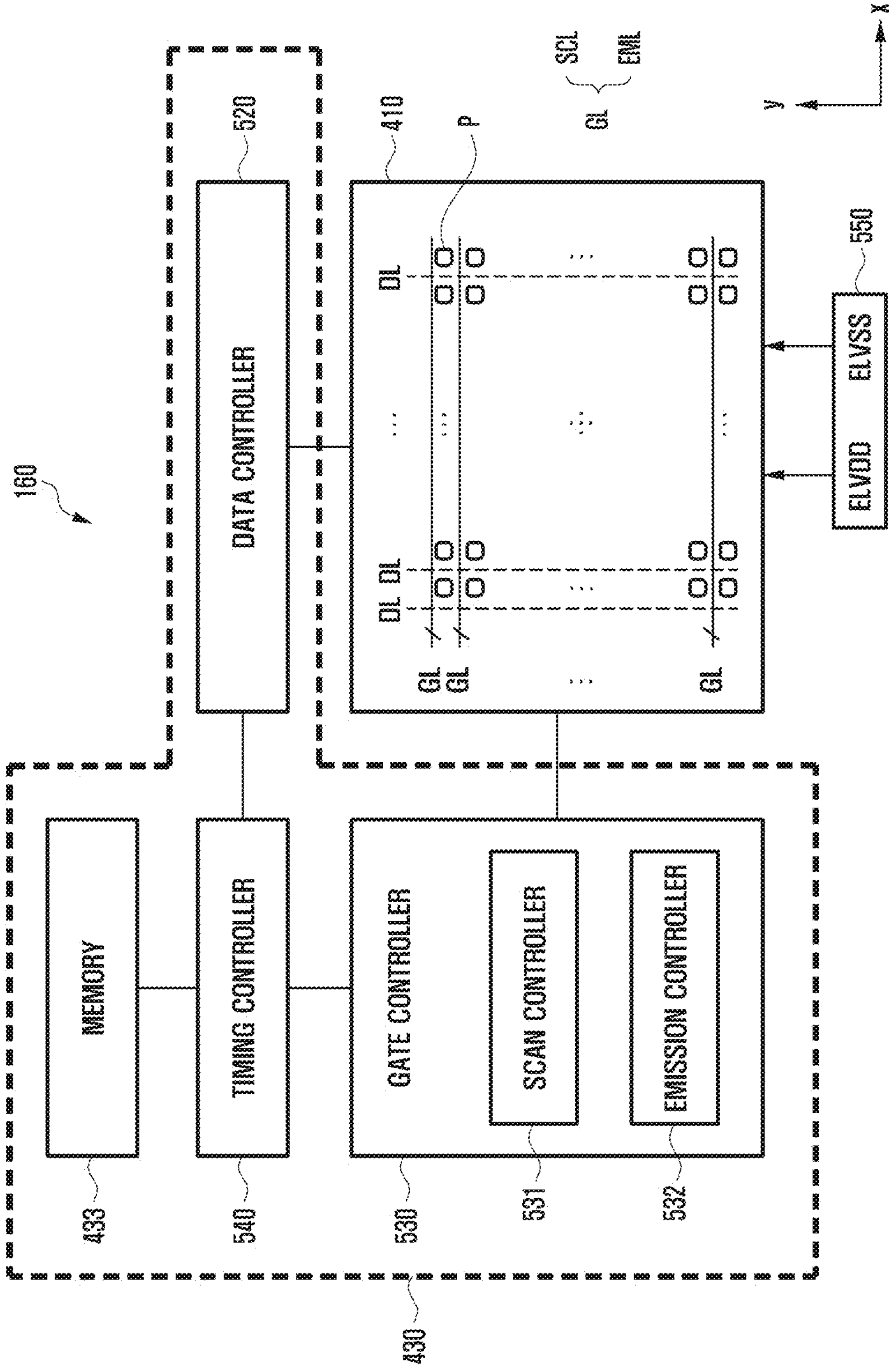
FIG. 5 is a block diagram illustrating a display module according to an example embodiment.

FIG. 5 is a block diagram illustrating a display module according to an example embodiment.

The display module 160 illustrated in FIG. 5 may be at least partially similar to or identical to the display module 160 illustrated in FIG. 1 and/or the display module 160 illustrated in FIG. 4. The display module 160 illustrated in FIG. 5 may include components different from those of the display module 160 illustrated in FIG. 1 and/or the display module 160 illustrated in FIG. 4.

With reference to FIG. 5, the display module 160 may include a display 410 (e.g., the display 201 of FIG. 2A, the display 320 of FIG. 3A, the display 410 of FIG. 4), a DDI 430 for driving the display 410, and a power supply unit 550 for supplying power (ELVDD, ELVSS) to the display 410.

According to an embodiment, the display module 160 according to an example embodiment may include a display storage (e.g., a display storage 1000 of FIG. 10, a display storage 1200 of FIG. 12). By replacing storage capacitors (e.g., storage capacitors cst1 and cst2 of FIG. 6) of the OLED display with the display storages 1000 and 1200, data voltage information of each pixel of the OLED display may be stored in the display storages 1000 and 1200. The display storages 1000 and 1200 may have a non-volatile characteristic and maintain data voltage information of each pixel during one frame and/or a plurality of frames regardless of a driving frequency of the OLED display.

According to an embodiment, the display 410 may include a display substrate and an active layer disposed on the display substrate to display an image.

According to an embodiment, the DDI 430 may include a memory 433, a data controller 520, a gate controller 530, and a timing controller 540.

For example, at least some of the memory 433, the data controller 520, the gate controller 530, or the timing controller 540 may be disposed at a substrate in which the display 410 is formed, and the remaining some may be included in the DDI 430.

For example, at least some of the memory 433, the data controller 520, the gate controller 530, or the timing controller 540 may be included in the display 410. In the case that at least some of the memory 433, the data controller 520, the gate controller 530, or the timing controller 540 are included in the display 410, they may be disposed in a non-display area (e.g., bezel area) of the display 410.

According to an embodiment, the display 410 (e.g., OLED display or flexible OLED display) may include a plurality of gate lines GL and a plurality of data lines DL. For example, the plurality of gate lines GL may be formed in a first direction (e.g., x-axis direction, horizontal direction in FIG. 5) and disposed at a designated interval. For example, the plurality of data lines DL may be formed in a second direction (e.g., y-axis direction, vertical direction in FIG. 5) substantially perpendicular to the first direction and disposed at a designated interval.

In an example embodiment, a "scan direction of the display 410" may be a direction (e.g., vertical direction, y-axis direction) perpendicular to a direction (e.g., horizontal direction, x-axis direction) in which gate lines GLs are formed. For example, in the case that a plurality of gate lines GLs are formed in a first direction (e.g., horizontal direction, x-axis direction in FIG. 5), the scan direction of the display 410 may be a second direction (e.g., vertical direction, y-axis direction in FIG. 5) perpendicular to the first direction.

According to an embodiment, in each of some areas of the display 410 in which a plurality of gate lines GL and a plurality of data lines DL intersect, a pixel P may be disposed.

According to an embodiment, each pixel P may be electrically connected, directly or indirectly, to a gate line GL and a data line DL, thereby displaying a designated grayscale.

According to an embodiment, the power supply unit 550 may generate driving voltages ELVDD and ELVSS for enabling a plurality of pixels P disposed in the display 410 to emit light. The power supply unit 550 may supply the driving voltages ELVDD and ELVSS to the display 410.

According to an embodiment, the pixels P may receive scan signals and emission (EM) signals through a gate line GL, and receive data signals through a data line DL. According to an embodiment, the pixels P are a power source for driving a micro light emitting diode (LED) (or organic light emitting diode (OLED)) and may receive a high potential voltage (e.g., ELVDD voltage) and a low potential voltage (e.g., ELVSS voltage).

According to an embodiment, each pixel P may include an OLED (or micro LED), and a pixel driving circuit (e.g., a plurality of transistors, a plurality of capacitors) for driving the OLED (or micro LED).

According to an embodiment, a pixel driving circuit disposed in each pixel P may control turning on (e.g., activated state) or off (e.g., deactivated state) an OLED (or micro LED) based on scan signals and emission signals.

According to an embodiment, the OLED (or micro LED) of each pixel P may, when turned on (e.g., activated), display a grayscale (e.g., luminance) corresponding to a data signal during one frame period (or during a part of one frame period).

According to an embodiment, the data controller 520 may drive a plurality of data lines DL. According to an embodiment, the data controller 520 may receive at least one synchronization signal and a data signal (e.g., digital image data) from the timing controller 540 or the processor (e.g., the processor 120 of FIG. 1). According to an embodiment, the data controller 520 may determine a data voltage (data) (e.g., analog image data) corresponding to the input data signal using a reference gamma voltage and a designated gamma curve. According to an embodiment, the data controller 520 may apply a data voltage (data) to a plurality of data lines DL, thereby supplying the data voltage (data) to each pixel P.

According to an embodiment, the processor 120 may control the DDI 430 to operate the display 410 at a first frequency (e.g., 240 Hz) according to a configuration of an application. The DDI 430 may generate a plurality of synchronization signals for operating the display 410 at a first frequency (e.g., 240 Hz) based on the control of the processor 120.

According to an embodiment, the processor 120 may control the DDI 430 to enable the display 410 to operate at a second frequency (e.g., 120 Hz) according to the configuration of the application. The DDI 430 may generate a plurality of synchronization signals for operating the display 410 at the second frequency (e.g., 120 Hz) based on the control of the processor 120.

According to an embodiment, the processor 120 may control the DDI 430 to enable the display 410 to operate at a third frequency (e.g., 90 Hz) according to the configuration of the application. The DDI 430 may generate a plurality of synchronization signals for operating the display 410 at the third frequency (e.g., 90 Hz) based on the control of the processor 120.

According to an embodiment, the processor 120 may control the DDI 430 to enable the display 410 to operate at a fourth frequency (e.g., 60 Hz) according to the configuration of the application. The DDI 430 may generate a plurality of synchronization signals for operating the display 410 at the fourth frequency (e.g., 60 Hz) based on the control of the processor 120.

According to an embodiment, the processor 120 may control the DDI 430 to enable the display 410 to operate at a fifth frequency (e.g., 30 Hz) according to the configuration of the application. The DDI 430 may generate a plurality of synchronization signals for operating the display 410 at the fifth frequency (e.g., 30 Hz) based on the control of the processor 120.

According to an embodiment, the processor 120 may control the DDI 430 to enable the display 410 to operate at a sixth frequency (e.g., 10 Hz) according to the configuration of the application. The DDI 430 may generate a plurality of synchronization signals for operating the display 410 at the sixth frequency (e.g., 10 Hz) based on the control of the processor 120.

The disclosure is not limited thereto, and the processor 120 may control the DDI 430 to operate the display 410 at less than 10 Hz according to the configuration of the application. The DDI 430 may generate a plurality of synchronization signals for operating the display 410 at less than 10 Hz based on the control of the processor 120.

According to an embodiment, the data controller 520 may receive a plurality of synchronization signals having the same frequency in units of a frame from the timing controller 540 or the processor (e.g., the processor 120 of FIG. 1). For example, the consecutive first and second frames may be driven based on a plurality of synchronization signals having the same frequency.

According to an embodiment, the data controller 520 may receive a plurality of synchronization signals having different frequencies in units of a frame from the timing controller 540 or the processor (e.g., the processor 120 of FIG. 1). For example, the consecutive first frame and second frame may be driven based on a plurality of synchronization signals having different frequencies.

According to an embodiment, the data controller 520 may receive a first synchronization signal having a first frequency (e.g., 240 Hz) from the timing controller 540.

According to an embodiment, the data controller 520 may receive a second synchronization signal having a second frequency (e.g., 120 Hz) smaller than the first frequency from the timing controller 540.

According to an embodiment, the data controller 520 may receive a third synchronization signal having a third frequency (e.g., 90 Hz) smaller than the second frequency from the timing controller 540.

According to an embodiment, the data controller 520 may receive a fourth synchronization signal having a fourth frequency (e.g., 60 Hz) smaller than the third frequency from the timing controller 540.

According to an embodiment, the data controller 520 may receive a fourth synchronization signal having a fifth frequency (e.g., 30 Hz) smaller than the fourth frequency from the timing controller 540.

According to an embodiment, the data controller 520 may receive a fourth synchronization signal having a sixth frequency (e.g., 10 Hz) smaller than the fifth frequency from the timing controller 540.

According to an embodiment, the gate controller 530 may drive a plurality of gate lines GL. According to an embodiment, the gate controller 530 may receive at least one synchronization signal from the timing controller 540 or the processor (e.g., the processor 120 of FIG. 1).

According to an embodiment, each gate line GL may include scan signal lines SCL to which scan signals are applied and emission signal lines EML to which emission signals are applied.

According to an embodiment, the gate controller 530 may include a scan controller 531 that sequentially generates a plurality of scan signals based on the synchronization signal and that supplies the generated plurality of scan signals to a scan signal line SCL.

According to an embodiment, the gate controller 530 may further include an emission controller 532 that sequentially generates a plurality of emission (EM) signals based on the synchronization signal and that supplies the generated plurality of emission EM signals to emission signal lines EML.

According to an embodiment, the gate controller 530 may receive a masking signal from the timing controller 540 or the processor (e.g., the processor 120 of FIG. 1).

According to an embodiment, the gate controller 530 may not supply at least one of a scan signal and/or an emission signal to at least some gate lines GL of the display 410 based on the masking signal. For example, the gate controller 530 may supply a scan signal and/or an emission signal to only at least some of the plurality of gate lines GL based on the masking signal, but may not supply a scan signal and/or an emission signal to the remaining gate lines GL.

According to an embodiment, among the plurality of pixels disposed at the display 410, pixels connected directly or indirectly to gate lines GLs to which scan signals and/or emission signals are not supplied may be turned off (e.g., deactivated state) during the corresponding frame period. In an embodiment, an operation in which the gate controller 530 receives a masking signal from the timing controller 540 or the processor 120 may be omitted.

According to an embodiment, the timing controller 540 may control driving timing of the data controller 520 and the gate controller 530. According to an embodiment, the timing controller 540 may receive data signals from the processor 120 in units of one frame. According to an embodiment, the timing controller 540 may convert a data signal (e.g., digital image data) input from the processor 120 to correspond to the resolution of the display 410 and supply the converted data signal to the data controller 520.

Figure 6:
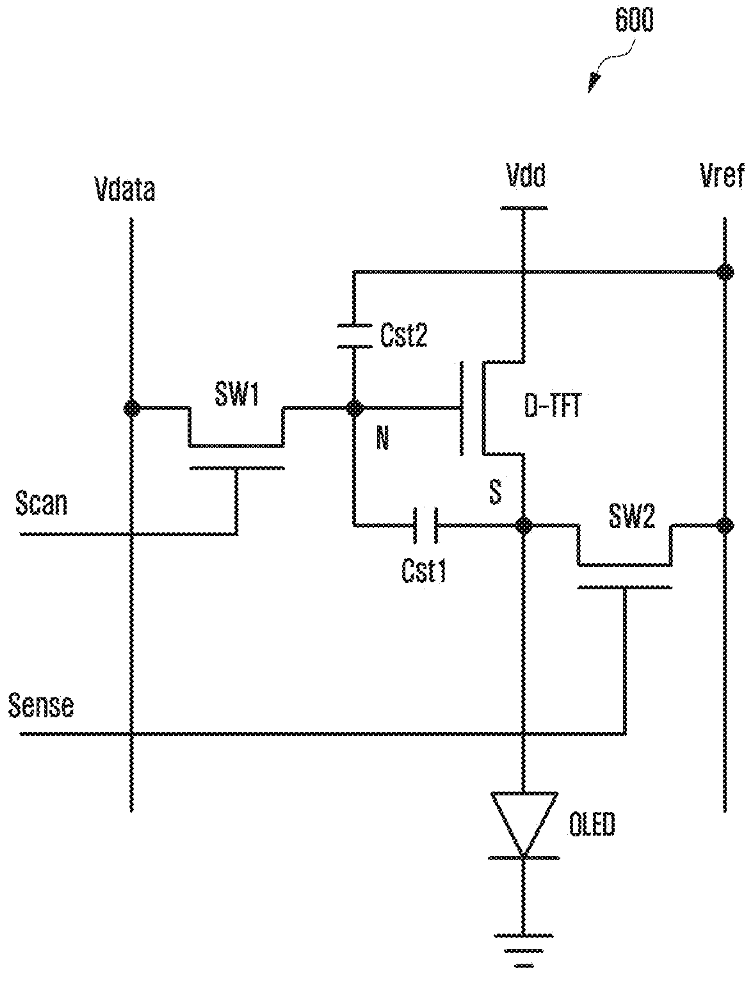
FIG. 6 is a diagram illustrating an example of a pixel driving circuit of an OLED display.
Figure 7:
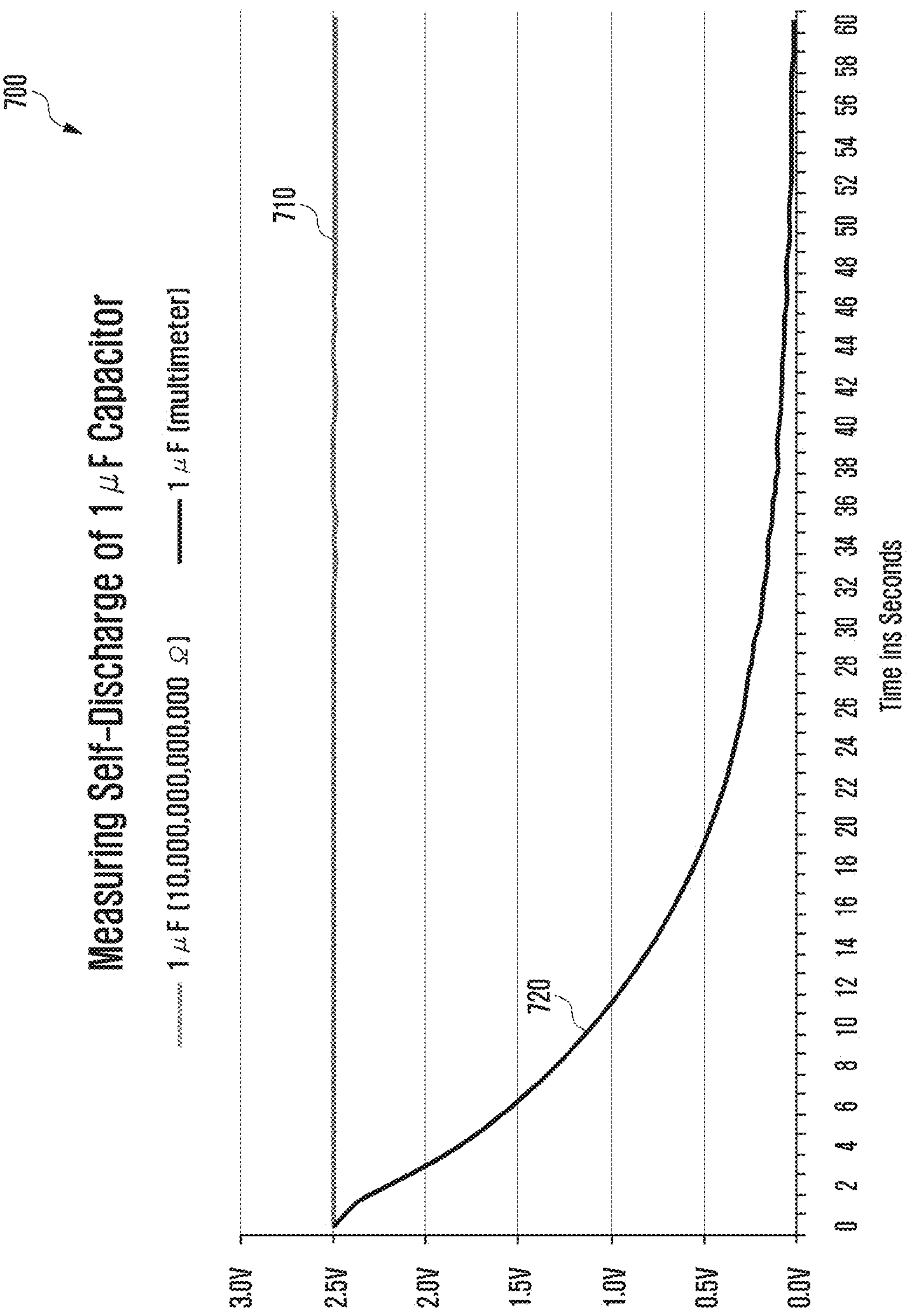
FIG. 7 is a graph illustrating a leakage characteristic of a storage capacitor included in an example pixel driving circuit.

FIG. 6 is a diagram 600 illustrating an example of a pixel driving circuit of an OLED display. FIG. 7 is a graph 700 illustrating a leakage characteristic of a storage capacitor included in a pixel driving circuit.

With reference to FIGS. 6 and 7, one pixel of an OLED display may include an OLED and a pixel driving circuit. The pixel driving circuit may include a plurality of thin film transistors (TFTs) for enabling the OLED to emit light and at least one capacitor cst1 and cst2. The plurality of TFTs may be oxide TFTs. For example, a pixel driving circuit for driving the OLED may include a first switch SW1, a second switch SW2, a driving TFT (D-TFT), a first storage capacitor Cst1, and a second storage capacitor Cst2. For example, when a scan signal is applied to a gate terminal of the first switch SW1, the first switch SW1 may be turned on. When the first switch SW1 is turned on, a data voltage Vdata may be applied to a gate node N of the driving TFT (D-TFT). When a sense signal is applied to a gate terminal of the second switch SW2, the second switch SW2 is turned on so that a data voltage may be stored (or written) in the storage capacitor. When the second switch SW2 is turned on, a reference voltage Vref is supplied to an output terminal of the driving TFT (D-TFT) so that an anode (e.g., positive electrode) of the OLED may be discharged. According to an embodiment, a method of driving one pixel of the OLED display may repeatedly perform (1) emission driving in which a current determined by a voltage stored in a storage capacitor flows to the OLED so that the OLED emits light; (2) initialization driving that initializes a voltage of the storage capacitor; (3) data write driving in which the first switch SW1 is turned on by a scan signal to store (or record) a data voltage in the storage capacitor and Vth compensation ($\Delta$Vt compensation) driving of the driving TFT (D-TFT), (4) Vth compensation ($\Delta$Vt compensation) driving of the driving TFT (D-TFT) and OLED discharging driving in which the second switch SW2 is turned on by a sense signal to discharge the anode (e.g., positive electrode) of the OLED, (5) Vth compensation ($\Delta$Vt compensation) driving of the driving TFT (D-TFT), and (6) emission driving in which a current determined by a voltage stored in the storage capacitor flows to the OLED so that the OLED emits light.

For example, a horizontal axis of FIG. 7 may represent the time after pixel information (e.g., emission data, data voltage) is stored in the storage capacitors cst1 and cst2, and a vertical axis thereof may represent the magnitude of a data voltage stored in the storage capacitors cst1 and cst2. Pixel information (e.g., emission data, data voltage) may be stored in the storage capacitors cst1 and cst2, and the storage capacitors cst1 and cst2 have a characteristic in which the stored charges are leaked over time. For example, in the case that the storage capacitors cst1 and cst2 have a capacity of 1 μF and that resistance of the node is very large (e.g., 10TΩ), a voltage value 710 of charges stored in the storage capacitors cst1 and cst2 is maintained constant, and no charge leakage occurs. However, the storage capacitors cst1 and cst2 are elements that store a potential difference, and have a characteristic in which the stored charges are sequentially lost; thus, the storage capacitors cst1 and cst2 have a leakage characteristic in which a voltage value 720 of the charges stored in the storage capacitors cst1 and cst2 is sequentially decreased. Therefore, in the case that the OLED display is driven at a low frequency such as 1 Hz to 10 Hz, leakage occurs in the storage capacitors cst1 and cst2 of each pixel, and a change in pixel information (e.g., emission data, data voltage) may occur due to leakage of the storage capacitors cst1 and cst2. In order to improve the problem due to leakage of the storage capacitors cst1 and cst2, it is necessary to additionally dispose storage capacitors cst1 and cst2 or increase the magnitude (e.g., increase the capacity) of the storage capacitors cst1 and cst2, but there may be limitations due to space constraints.

Figure 8:
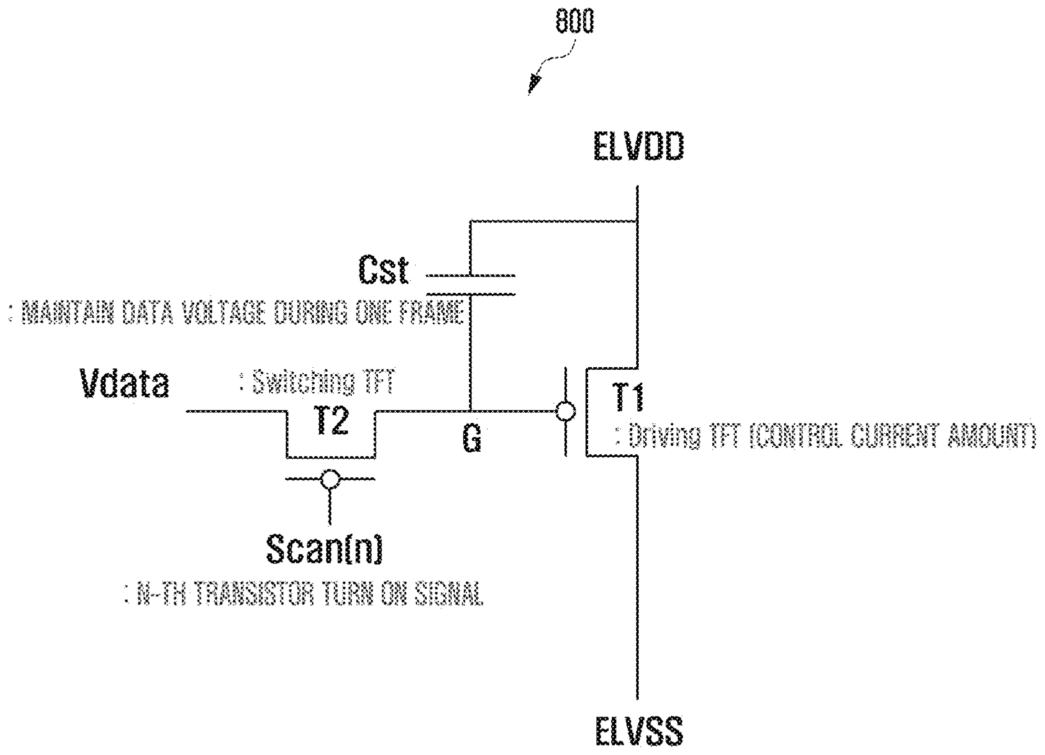
FIGS. 8 and 9 are diagrams illustrating pixel circuits of an OLED display and example signals for driving example pixel circuits.
Figure 9:
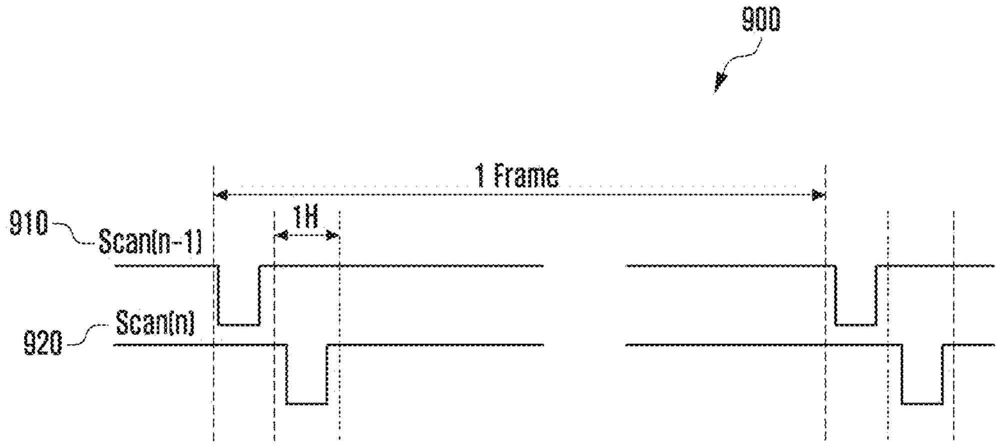

FIGS. 8 and 9 are a diagram illustrating a pixel circuit 800 of an OLED display and a diagram 900 illustrating signals for driving the pixel circuit 800, respectively.

With reference to FIGS. 8 and 9, one pixel among a plurality of pixels included in an OLED display is illustrated. According to an embodiment, scan signals 910 and 920 may be sequentially input to a switching TFT T2 of pixel circuits 800 disposed in each pixel during one horizontal (1H) period. Data may be input to the storage capacitor cst, and a data voltage may be maintained during 1 frame (1fram). By controlling an amount of current flowing to a driving TFT T1 with a data voltage stored in the storage capacitor cst, the OLED may emit light. Such an operation of the pixel circuit 800 is performed equally even in all frames, and even in the case that the same screen as before is reproduced, the same operation may be repeated. Therefore, even on a static screen driving an OLED display at a low scan rate such as 1 Hz, an operation of storing (or writing) a data voltage in the storage capacitor should continue; thus, an overall operating time and/or power consumption may be increased.

FIG. 10 is a diagram illustrating a display storage (e.g., phase change memory (PCM)) disposed in a display according to an example embodiment.

With reference to FIG. 10, an OLED display (e.g., the display 201 of FIG. 2A, the display 320 of FIG. 3A) of the electronic device (e.g., the electronic device 101 of FIG. 1, the electronic device 200 of FIGS. 2A and 2B, the electronic device 300 of FIGS. 3A and 3B) according to an example embodiment may include a display storage 1000 (e.g., phase change memory (PCM)).

The display storage 1000 according to an example embodiment may replace a storage capacitor of an OLED display, thereby storing a data voltage of each pixel of the OLED display in the display storage 1000. The display storage 1000 may have a non-volatile characteristic and maintain a data voltage of each pixel during one frame and/or a plurality of frames regardless of a driving frequency of the OLED display.

According to an embodiment, the display storage (e.g., PCM) 1000 may include a plurality of pixel memories M. The display storage (e.g., PCM) 1000 may include a plurality of first memory lines 1010 and 1030 disposed in a first direction (e.g., x-axis direction, horizontal direction in FIG. 10) and a plurality of second memory lines 1020 and 1040 disposed in a second direction (e.g., y-axis direction, vertical direction in FIG. 10) orthogonal to the first direction. The plurality of first memory lines 1010 and 1030 and the plurality of second memory lines 1020 and 1040 may be disposed to be orthogonal to each other and be disposed not to be electrically connected (e.g., not in contact). A phase change material (e.g., a phase change material 1243 of FIG. 12) may be disposed at each portion in which the plurality of first memory lines 1010 and 1030 and the plurality of second memory lines 1020 and 1040 intersect; thus, a plurality of pixel memories M may be formed.

According to an embodiment, a pixel memory M corresponding to each of a first pixel 1001 (e.g., red pixel), a second pixel 1002 (e.g., green pixel), and a third pixel 1003 (e.g., blue pixel) may be formed at a portion in which the plurality of first memory lines 1010 and 1030 and the plurality of second memory lines 1020 and 1040 intersect.

For example, each of the red pixel, the green pixel, and the blue pixel may express a grayscale of 0 to 255 (e.g., 256 steps), and an 8-bit memory may be required to record data voltage information for each pixel to express 0 to 255 grayscales.

For example, line intersections (e.g., intersections P1 and P2 of FIG. 11) may be formed at a portion in which three first memory lines 1010 and three second memory lines 1020 intersect. Each of the line intersections may be a 1-bit memory space storing '0 or 1'. A pixel memory M of total 9 bits capable of storing a data voltage of each pixel may be formed using three first memory lines 1010 and three second memory lines 1020. 8 bits of 9 bits of the pixel memory M may be used for grayscale expression, and the remaining 1 bit may be utilized as a spare bit for an error in the memory space or may be utilized as a parity bit for parity check for error checking.

For example, the DDI (e.g., the DDI 430 of FIGS. 4 and 5, the DDI 430 of FIG. 18) and the display storage 1000 (e.g., PCM) may be electrically connected, directly or indirectly. The DDI 430 may perform an operation of inputting (writing) pixel data (e.g., data voltage) to each bit (e.g., intersection of the first memory lines 1010 and the second memory lines 1020) of the pixel memory M of each pixel and an operation of loading (reading) the stored pixel data based on the control of the processor (e.g., the processor 120 of FIG. 1).

For example, the DDI 430 may input (write) pixel data to the pixel memory M of each pixel in any one frame (e.g., first frame) based on the control of the processor (e.g., the processor 120 of FIG. 1). After the DDI 430 inputs (writes) pixel data to the pixel memory M of each pixel in any one frame, in the case that there is no change in pixel data in a next frame (e.g., second frame), the DDI 430 may skip an operation of inputting (writing) pixel data of the next frame to the pixel memory M.

According to an embodiment, when the number of the first memory lines 1010 and 1030 and/or the second memory lines 1020 and 1040 corresponding to each pixel is changed, the number of bits of the pixel memory M may be variously changed for each pixel.

For example, when the pixel memory M is composed of three first memory lines 1010 and four second memory lines 1020, total 12 bits of pixel memory M may be formed. When total 12 bits of pixel memory M is constituted, expressible grayscales may be increased in proportion to the number of increased bits.

For example, when the pixel memory M is composed of four first memory lines 1010 and three second memory lines 1020, total 12 bits of pixel memory M may be formed. When total 12 bits of pixel memory M is constituted, expressible grayscales may be increased in proportion to the number of increased bits.

For example, when the pixel memory M is composed of four first memory lines 1010 and four second memory lines 1020, total 16 bits of pixel memory M may be formed. When total 16 bits of pixel memory M is constituted, expressible grayscales may be increased in proportion to the number of increased bits.

For example, in the case that each pixel memory M includes 12 or 16 bits of memory space, when 10 bits among 12 or 16 bits are used for grayscale expression, total 1024 grayscales (e.g., 0 to 1023 grayscale) may be expressed. When 11 bits among 12 bits or 16 bits are used for grayscale expression, total 2048 grayscales (e.g., 0 to 2047 grayscales) may be expressed. When 12 bits or 12 bits among 16 bits are used for grayscale expression, total 4096 grayscales (e.g., 0 to 4095 grayscales) may be expressed.

Figure 11:
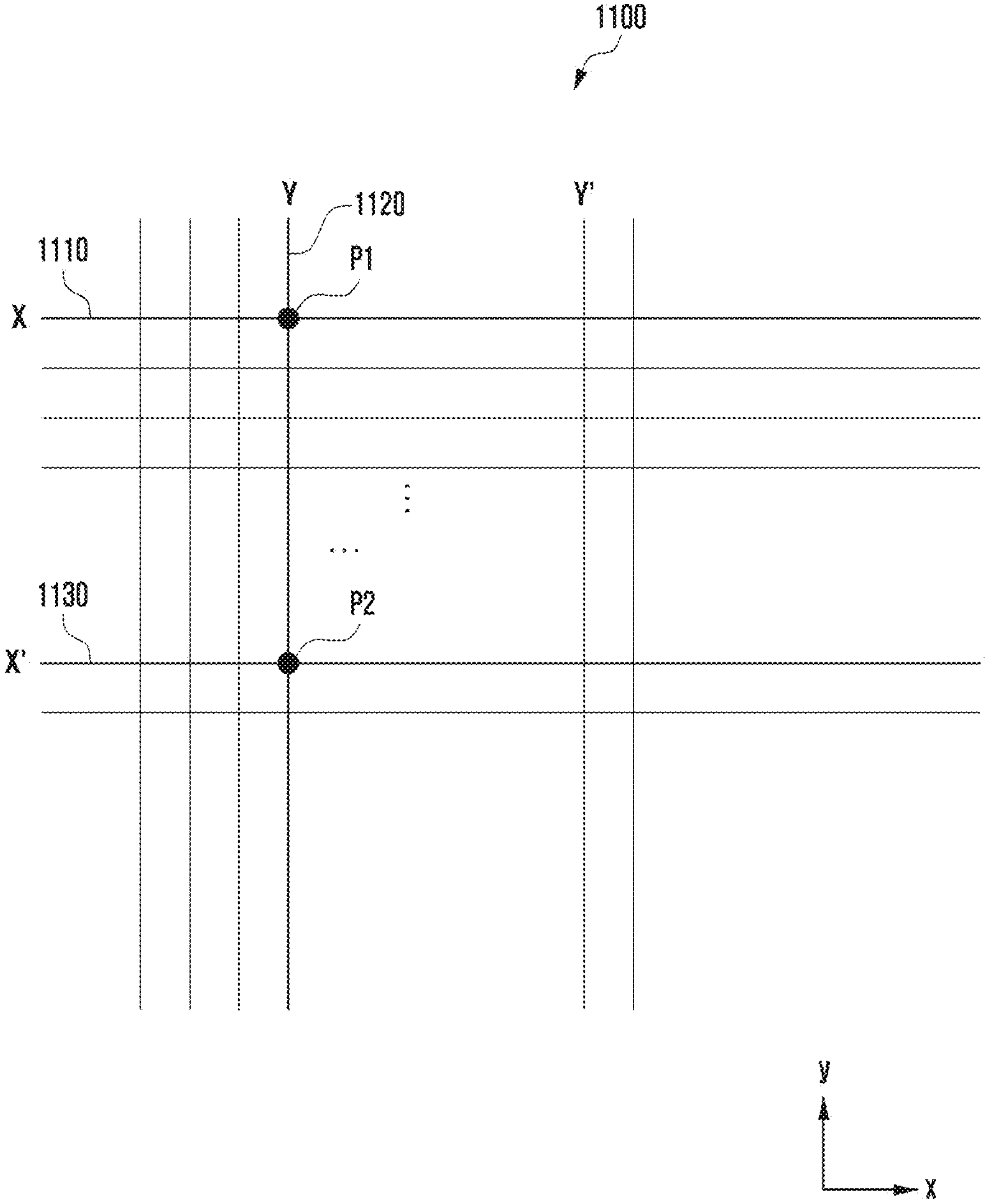
FIG. 11 is a diagram illustrating a disposition structure of lines of a display storage (e.g., PCM) according to an example embodiment.

FIG. 11 is a diagram illustrating a disposition structure of lines of a display storage (e.g., PCM) according to an example embodiment.

With reference to FIG. 11, according to an embodiment, a first memory line 1110 for constituting a pixel memory M of a first pixel may be disposed in a first direction (e.g., x-axis direction, horizontal direction in FIG. 11), and a second memory line 1120 may be disposed in a second direction (e.g., y-axis direction, vertical direction in FIG. 11) orthogonal to the first direction. The first memory line 1110 and the second memory line 1120 may be disposed not to be electrically connected (e.g., not in contact). A phase change material (e.g., a phase change material 1243 of FIG. 12) may be disposed at each portion in which the first memory line 1110 and the second memory line 1120 intersect. A third memory line 1130 for constituting a pixel memory M of the second pixel may be disposed in a first direction (e.g., x-axis direction, horizontal direction in FIG. 11), and the second memory line 1120 may be disposed in a second direction (e.g., y-axis direction, vertical direction in FIG. 11) orthogonal to the first direction. The third memory line 1130 and the second memory line 1120 may be disposed not to be electrically connected (e.g., not in contact). The phase change material (e.g., phase change material 1243 of FIG. 12) may be disposed at each portion in which the first memory line 1110 and the second memory line 1120 intersect.

According to an embodiment, the DDI (e.g., the DDI 430 of FIGS. 4 and 5, the DDI 430 of FIG. 18) may input (write) information of a data voltage to the pixel memory M of the first pixel. For example, the DDI 430 may supply a first voltage to the first memory line 1110 disposed in the x-axis direction, and supply a second voltage to the second memory line 1120 disposed in the y-axis direction. Thereby, the DDI 430 may input (write) information of a data voltage (e.g., “0 or 1” corresponding to 1 bit among information of 8 bits of data voltage) to a 1-bit first memory space formed at the first intersection point P1 in which the first memory line 1110 and the second memory line 1120 intersect. A display storage (e.g., the display storage 1000 of FIG. 10) according to an example embodiment may store (or record) “0 or 1” in a 1-bit memory space formed at a first intersection P1 using a phase change material (e.g., the phase change material 1243 of FIG. 12) even with a low potential difference between the first memory line 1110 and the second memory line 1120.

According to an embodiment, the DDI 430 may input (write) information of a data voltage to a pixel memory M of a second pixel. For example, the DDI 430 may supply a third voltage to the third memory line 1110 disposed in the x-axis direction, and supply a second voltage to the second memory line 1120 disposed in the y-axis direction. Thereby, the DDI 430 may input (write) information of a data voltage (e.g., “0 or 1” corresponding to 1 bit among information of an 8-bit data voltage) to a 1-bit second memory space formed at a second intersection point P2 in which the second memory line 1120 and the third memory line 1130 intersect. A display storage (e.g., the display storage 1000 of FIG. 10) according to an example embodiment may store (or record) “0 or 1” in a 1-bit memory space formed at a second intersection P2 using a phase change material (e.g., the phase change material 1243 of FIG. 12) even with a low potential difference between the second memory line 1120 and the third memory line 1130.

According to an embodiment, the DDI 430 may equally supply a second voltage to the second memory line 1120 disposed in the y-axis direction and supply different voltages to the first memory line 1110 and the third memory line 1130, thereby enabling an operation of inputting (writing) information of a data voltage of the first pixel and an operation of loading (reading) a data voltage of the second pixel to be performed simultaneously. Conversely, the DDI 430 may equally supply the second voltage to the second memory line 1120 disposed in the y-axis direction and supply different voltages to the first memory line 1110 and the third memory line 1130, thereby enabling an operation of loading (reading) information of a data voltage of the first pixel and an operation of inputting (writing) a data voltage of the second pixel to be performed simultaneously. Thereby, by enabling inputting (writing) and loading (reading) of data voltages of multiple pixels to be performed simultaneously, the delay according to inputting (writing) and loading (reading) of information of data voltages of pixels may be reduced.

Figure 13:
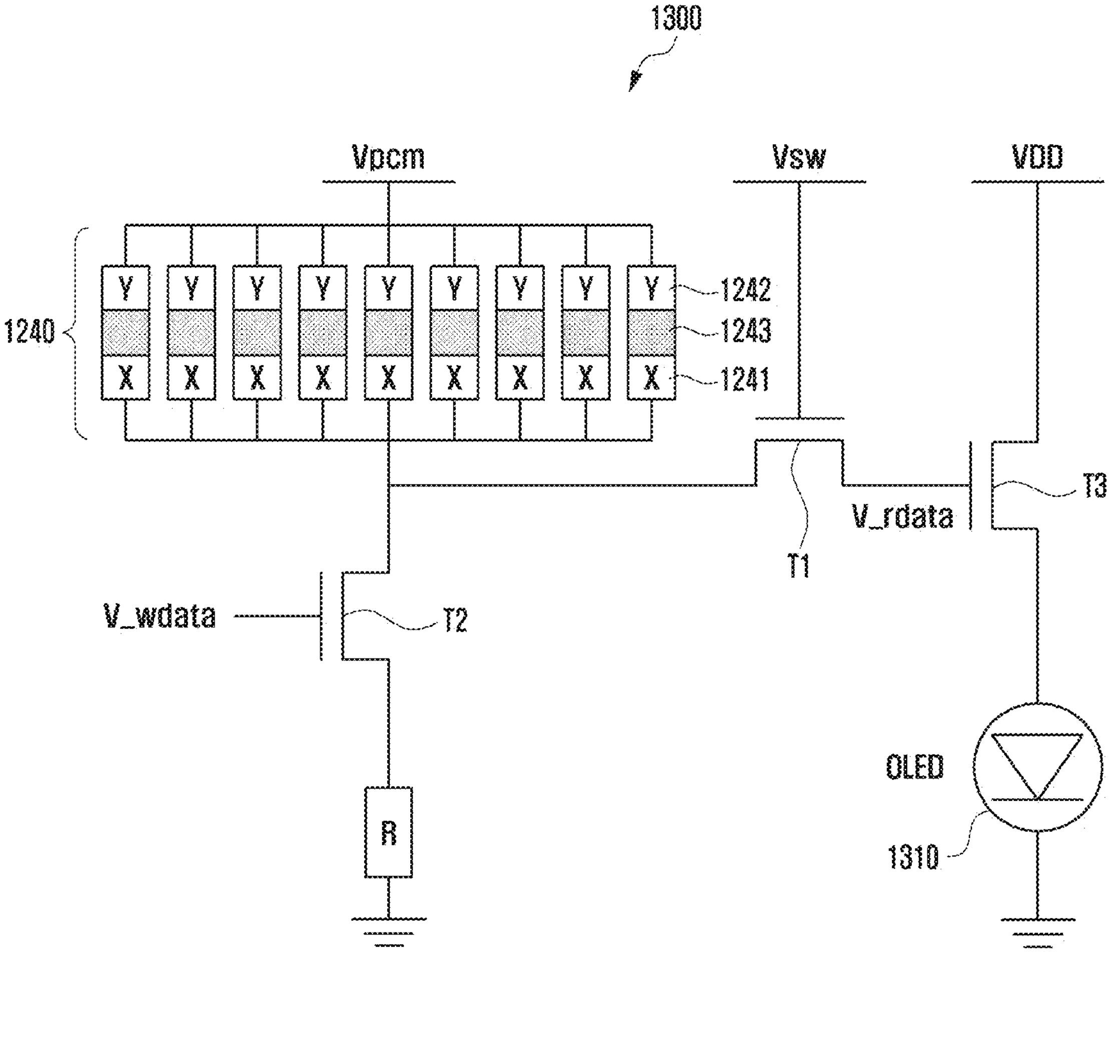
FIG. 13 is a block diagram illustrating a display including a display storage (e.g., PCM) according to an example embodiment.

FIG. 12 is a block diagram illustrating a display storage 1200 (e.g., PCM) according to an example embodiment. FIG. 13 is a block diagram illustrating a display 1300 including a display storage (e.g., PCM) according to an example embodiment.

Figure 18:
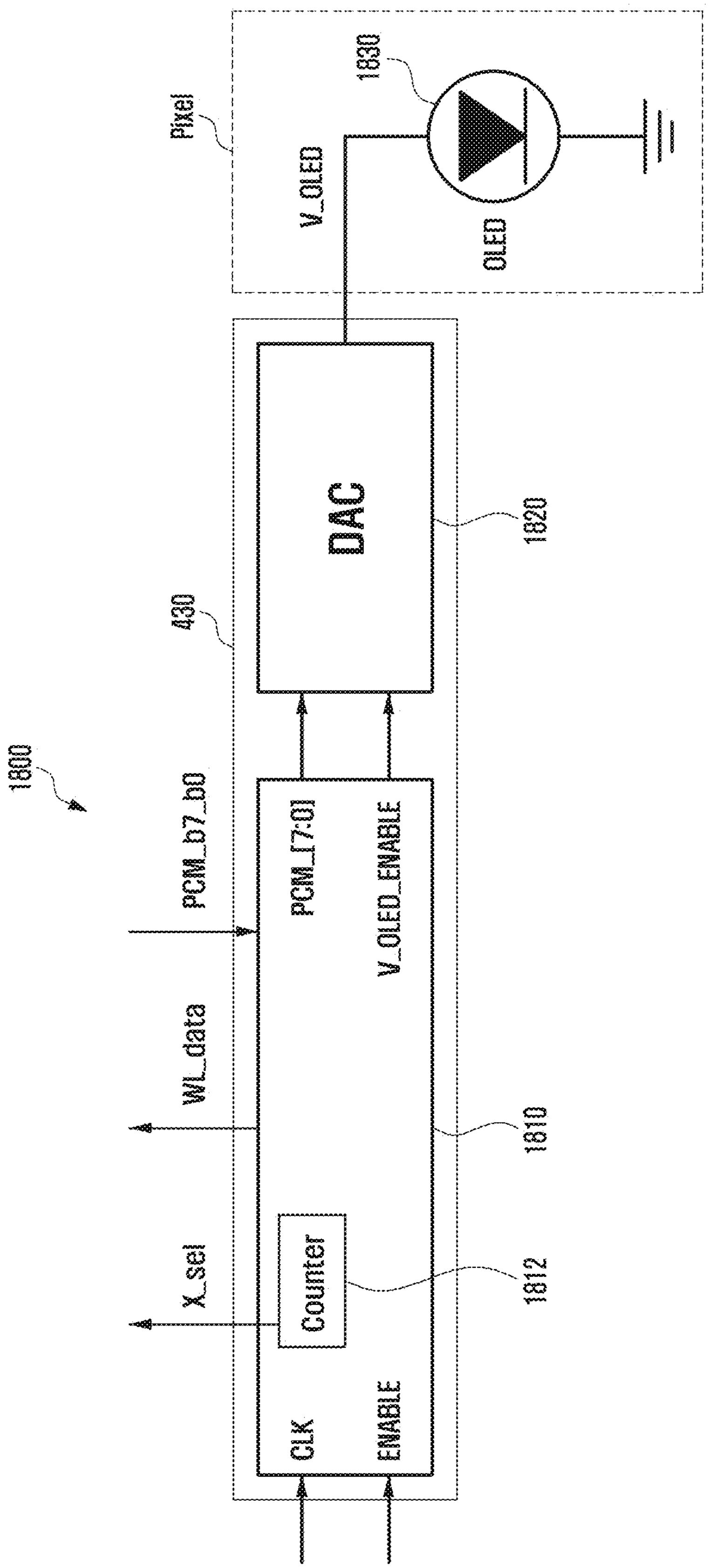
FIG. 18 is a block diagram illustrating a display driver IC (DDI) according to an example embodiment.

With reference to FIGS. 12 and 13, an electronic device (e.g., the electronic device 101 of FIG. 1, the electronic device 200 of FIGS. 2A and 2B, and the electronic device 300 of FIGS. 3A and 3B) according to an example embodiment may include an OLED display 1300 and a DDI 1250 (e.g., the DDI 430 of FIGS. 4 and 5, and the DDI 430 of FIG. 18).

According to an embodiment, the OLED display 1300 may include a display storage 1200 (e.g., the display storage 1000 of FIG. 10).

According to an embodiment, the display storage 1200 may include a plurality of pixel memories 1240 (e.g., pixel memories M) for storing (or recording) data voltage information of a first pixel 1210 (e.g., red pixel), a second pixel 1220 (e.g., green pixel), and a third pixel 1230 (e.g., blue pixel) of the OLED display.

For example, each of the plurality of pixel memories 1240 may include a plurality of first memory lines 1241 (e.g., the plurality of first memory lines 1010 and 1030 of FIG. 10) disposed in a first direction (e.g., the x-axis direction of FIGS. 10 and 11, the horizontal direction in FIGS. 10 and 11), a plurality of second memory lines 1242 (e.g., the plurality of second memory lines 1020 and 1040 of FIG. 10) disposed in a second direction (e.g., the y-axis direction of FIGS. 10 and 11, the vertical direction in FIGS. 10 and 11) orthogonal to the first direction, and phase change materials 1243 disposed at each portion in which the plurality of first memory lines 1241 and the plurality of second memory lines 1242 intersect.

According to an embodiment, a plurality of first memory lines 1241, X and a plurality of second memory lines 1242, Y may be disposed to be orthogonal to each other and to be not electrically connected, directly or indirectly (e.g., not in contact). Phase change materials 1243 may be disposed between the plurality of first memory lines 1241, X and the plurality of second memory lines 1242, Y.

According to an embodiment, a pixel memory 1240 corresponding to each of the red pixel 1210, the green pixel 1220, and the blue pixel 1230 may be formed. In the case that the pixel memory 1240 includes a 9-bit memory space, in order to express 0 to 255 grayscales with 8 bits among the 9 bits, data voltage information may be stored (or written) and loaded (or read). The remaining 1 bit among the 9 bits may be utilized as a spare bit for an error in the memory space, or may be utilized as a parity bit for parity check for error checking.

According to an embodiment, a driving circuit for driving a plurality of pixel memories 1240 of the display storage 1200 may be disposed in peripheral portions of the DDI 1250 (e.g., the DDI 430 of FIGS. 4 and 5, and the DDI 430 of FIG. 18).

For example, the DDI 1250 may input (write) and load (read) data voltage information (e.g., pixel data) to and from the pixel memory 1240 of each pixel based on the control of the processor (e.g., the processor 120 of FIG. 1). The DDI 1250 may simultaneously perform an operation of inputting (writing) data voltage information of the first pixel and an operation of loading (reading) a data voltage (e.g., pixel data) of the second pixel. Thereby, by enabling inputting (writing) and loading (reading) of data voltage information (e.g., pixel data) of a plurality of pixels to be performed simultaneously, the delay in the data voltage information (e.g., pixel data) of the plurality of pixels may be reduced.

For example, the DDI 1250 may input (write) data voltage information (e.g., pixel data) in the pixel memory 1240 of a first pixel in a first frame period based on the control of the processor 120. In the case that there is no change in data voltage information (e.g., pixel data) of the first pixel in a second frame after the first frame, the DDI 1250 may skip an operation of inputting (writing) and/or loading (reading) data voltage information (e.g., pixel data) of the first pixel in the second frame period.

According to an embodiment, during a writing operation of data voltage information, the DDI 1250 may turn off a first TFT T1 (e.g., first switch (Vsw)) to block the current flow to an OLED 1310. The DDI 1250 may turn on a second TFT T2 to input a first voltage (V_wdata) to the first memory lines 1241, X and input a second voltage (Vpcm) to the second memory lines 1242, Y. The DDI 1250 may change a phase of the phase change material 1243 using a potential difference between the first voltage (V_wdata) input to the first memory lines 1241, X and the second voltage (Vpcm) input to the second memory lines 1242, Y to store 1 bit ('0 or 1') of data voltage information (V_rdata).

According to an embodiment, during a reading (or loading) operation of data voltage information, the DDI 1250 may turn off the second TFT T2 and turn on the first TFT T1 (e.g., first switch (Vsw)) to control the current flowing to the OLED 1310 with data voltage information (V_rdata).

According to an embodiment, the DDI 1250 may turn on a third TFT T3 (e.g., driving TFT) during a light emitting period to enable the OLED 1310 to emit light with a grayscale value according to information (V_rdata) of a data voltage.

The memory (e.g., the memory 130 of FIG. 1) of the electronic device (e.g., the electronic device 101 of FIG. 1, the electronic device 200 of FIGS. 2A and 2B, the electronic device 300 of FIGS. 3A and 3B) according to an example embodiment may include instructions that cause the processor (e.g., the processor 120 of FIG. 1) to perform operations according to FIGS. 12 and 13.

Figure 14:
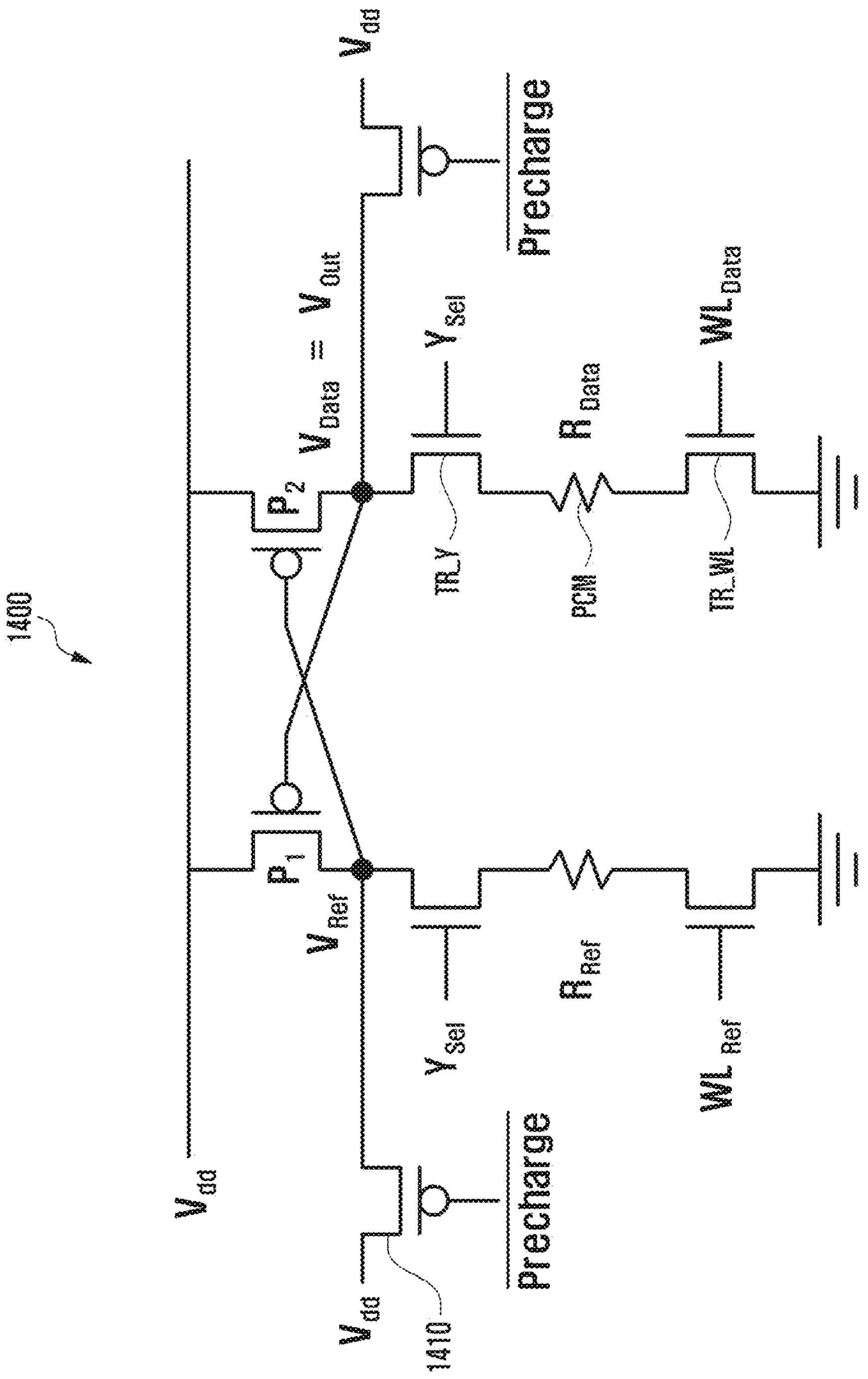
FIG. 14 is a diagram illustrating a driving circuit of a display storage (e.g., PCM) according to an example embodiment.
Figure 15:
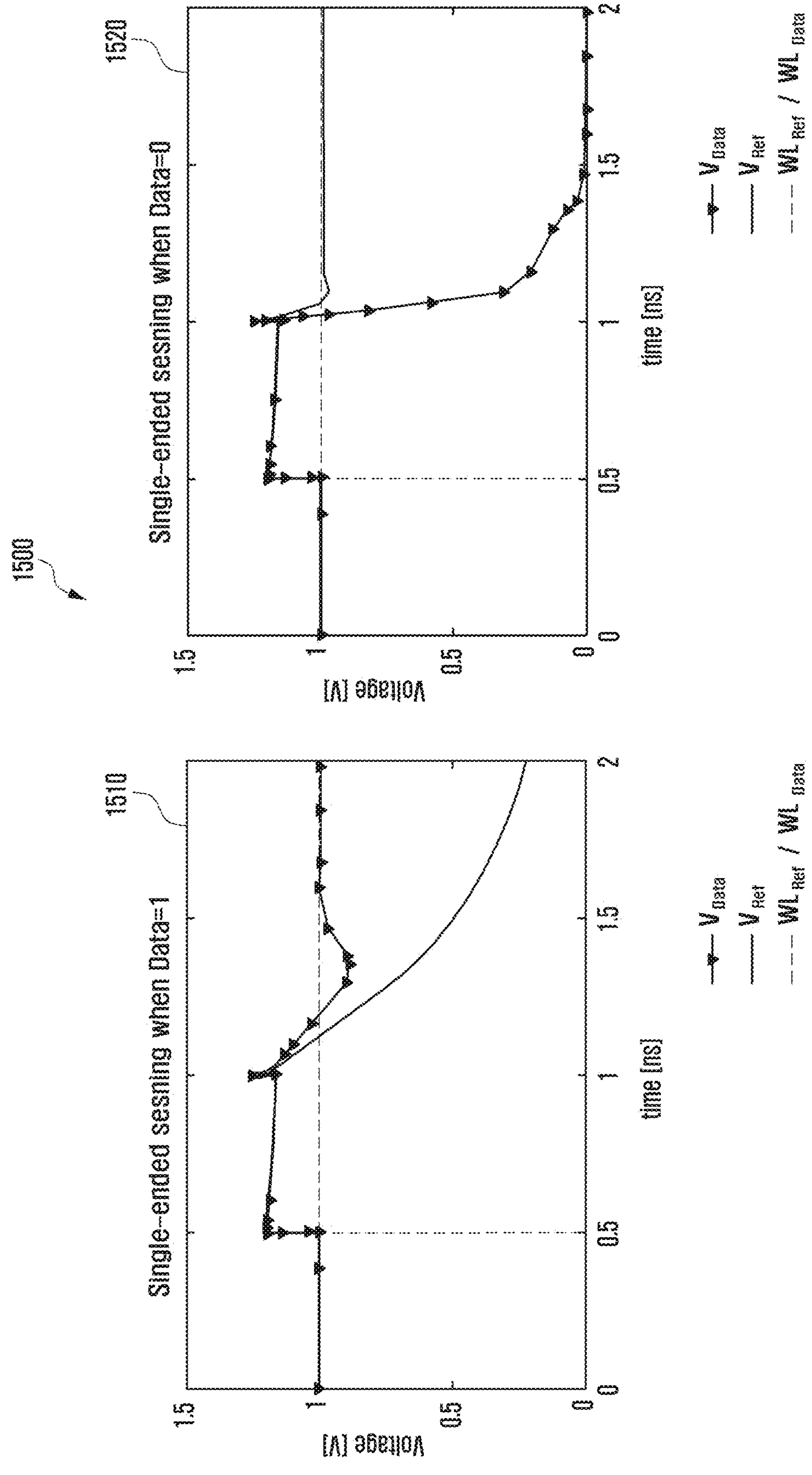
FIG. 15 is a graph illustrating Vdata when '0' and '1' are written in a pixel memory of a display storage (e.g., PCM) according to an example embodiment.

FIG. 14 is a diagram illustrating a driving circuit of a display storage (e.g., PCM) according to an example embodiment. FIG. 15 is a graph 1500 illustrating Vdata when '0' and '1' are written in a pixel memory of a display storage (e.g., PCM) according to an example embodiment.

With reference to FIGS. 12, 14, and 15, during an inputting (writing) and reading (or loading) operation of data voltage information (e.g., pixel data), the DDI 1250 (e.g., the DDI 430 of FIGS. 4 and 5 and the DDI 430 of FIG. 18) may operate a driving circuit 1400 of a display storage (e.g., PCM) based on the control of the processor (e.g., the processor 120 of FIG. 1). Read and write of data voltage information (e.g., pixel data) may be distinguished according to a WL_data voltage.

According to an embodiment, during an inputting (writing) operation of data voltage information (e.g., pixel data) of '0', the DDI 1250 may input 0V to Y_sel and precharge V_data to Vdd. Thereafter, the DDI 1250 may input a high voltage (high_voltage) (e.g., high voltage=Vdd) to WL_data and input a high voltage (high_voltage) (e.g., high voltage=Vdd) to Y_sel. The DDI 1250 may enable a high voltage (high_voltage) (e.g., high voltage=Vdd) to be maintained during a certain time (e.g., 3 ns). Thereafter, the DDI 1250 may enable a high current to flow from TR_Y to TR_WL to write reset ('0') in R_data (PCM). Thereafter, the DDI 1250 may input '0V' to Y_sel and precharge V_data to Vdd. 'Reset' (e.g., '0') may be written in R_data (PCM) (1520).

According to an embodiment, during an inputting (writing) operation of data voltage information (e.g., pixel data) of '1', the DDI 1250 may input 0V to Y_sel and precharge V_data to Vdd. Thereafter, the DDI 1250 may input a low voltage (low_voltage) (e.g., low voltage=(Vdd+V_th)/2)) and a high voltage (high_voltage) (e.g., high voltage=Vdd) to WL_data. The DDI 1250 may enable a low voltage (low_voltage) (e.g., low voltage=(Vdd+V_th)/2)) and a high voltage (high_voltage) (e.g., high voltage (Vdd)) to be maintained during a certain time (e.g., 10 ns). Thereafter, the DDI 1250 may enable a normal current to flow from TR_Y to TR_WL to write set ('1') in R_data (PCM). Thereafter, the DDI 1250 may input 0V to Y_sel and precharge V_data to Vdd. A 'set' (e.g., '1') may be written (1510) in R_data (PCM).

According to an embodiment, after Y_sel and WL_data are applied according to information of a data voltage stored in R_data (PCM), V_out may vary. During a reading (or loading) operation of data voltage information (e.g., pixel data), it may be identified whether '1' was recorded (1510) or '0' was recorded (1520) as data voltage information (e.g., pixel data) stored in the PCM with a V_out voltage.

According to an embodiment, during a reading (or loading) operation of data voltage information (e.g., pixel data), the DDI 1250 may input 0V to Y_sel and precharge V_data to Vdd. Thereafter, the DDI 1250 may input a threshold voltage (V_th) of a driving TFT to Y_sel and a threshold voltage (V_th) of the driving TFT to WL_data. The DDI 1250 may enable a threshold voltage (V_th) of the driving TFT input to Y_sel and a threshold voltage (V_th) of the driving TFT input to WL_data to be maintained during a certain time (e.g., 3 ns).

Thereafter, the DDI 1250 enables the minimum current to flow to TR_Y and TR_WL so that a voltage applied to R_data (PCM) becomes V_data. For example, in the case that R_data is in a 'reset' state, almost no voltage is applied to R_data (PCM); thus, the DDI 1250 may sense a value '0'. For example, in the case that R_data is in a 'set' state, V_dd is applied to R_data (PCM); thus, the DDI 1250 may sense a value '1'.

According to an embodiment, data voltage information (e.g., pixel data) may be output after about 1.0 ns after Vdd is applied to Vdata regardless of whether data voltage information (e.g., pixel data) stored in the pixel memory (e.g., the pixel memory 1240 of FIG. 13) (e.g., R_data (PCM) of FIG. 14) is '0' or '1'. When a resolution of the OLED display is 2560*2560 and a driving frequency thereof is 120 Hz, such an output time may be smaller than 1.27 ns, which is the maximum accessible time of 1 pixel. Therefore, because a read latency time of the PCM is 1.0 ns, there may be no restrictions on applying the display storage (e.g., the display storage 1000 of FIG. 10) (e.g., the display storage 1200 of FIG. 12) to the OLED display in consideration of a read latency time of the PCM.

The memory (e.g., the memory 130 of FIG. 1) of the electronic device (e.g., the electronic device 101 of FIG. 1, the electronic device 200 of FIGS. 2A and 2B, and the electronic device 300 of FIGS. 3A and 3B) according to an example embodiment may include instructions that cause the processor (e.g., the processor 120 of FIG. 1) to perform operations according to FIG. 14.

Figure 16:
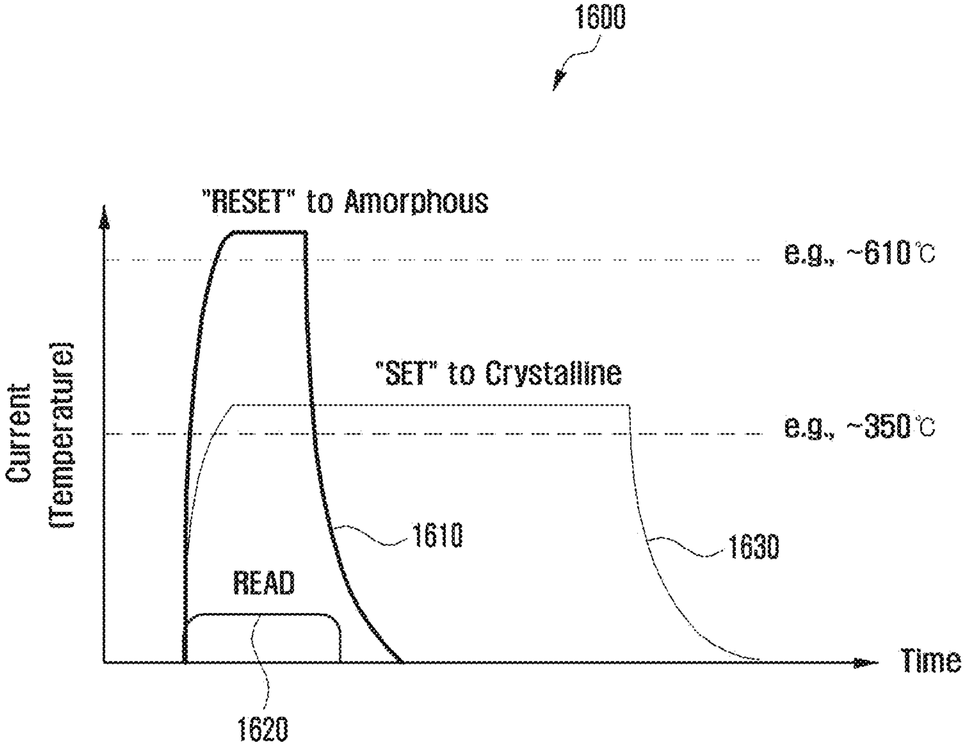
FIG. 16 is a graph illustrating an example time difference between data read and write of a display storage (e.g., PCM).

FIG. 16 is a graph 1600 illustrating a time difference between data read and write of a display storage (e.g., PCM).

With reference to FIG. 16, a difference between times 1610 and 1630 for writing data voltage information (e.g., pixel data) and a time 1620 for reading data voltage information (e.g., pixel data) in and from the pixel memory (e.g., the pixel memory 1240 of FIG. 13) (e.g., R_data (PCM) of FIG. 14) may be identified.

For example, the time 1620 for reading data voltage information (e.g., pixel data) from the pixel memory (PCM) 1240 may be smaller than the time 1610 for writing 'reset' (e.g., '0') in the pixel memory (PCM) 1240. For example, the time 1620 for reading data voltage information (e.g., pixel data) from the pixel memory (PCM) 1240 may be smaller than the time 1630 for writing 'set' (e.g., '1') in the pixel memory (PCM) 1240. The time 1630 for writing 'set' (e.g., '1') in the pixel memory (PCM) 1240 among an overall operating time of the pixel memory (PCM) 1240 may be most dominant.

Figure 17:
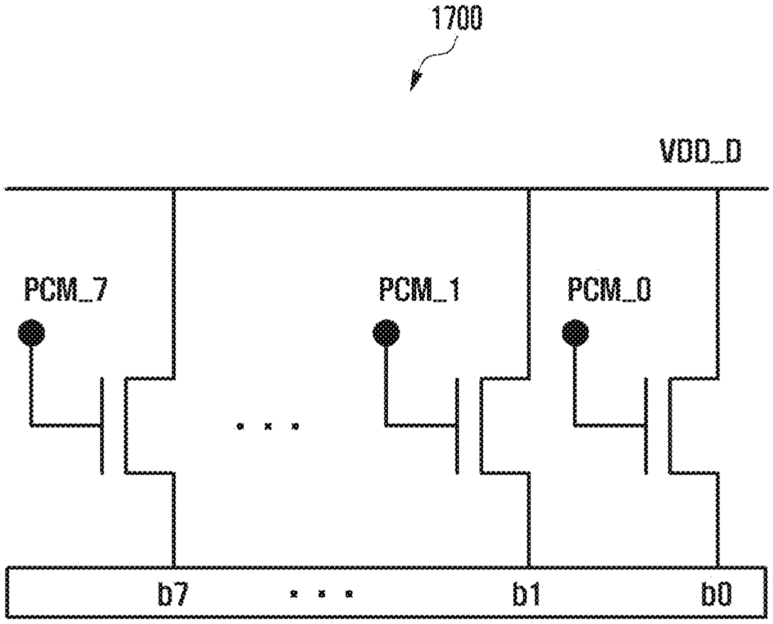
FIG. 17 is a diagram illustrating an example of expressing 256 grayscales including black (e.g., 0 grayscale) in 8 bits of a display storage (e.g., PCM) according to an example embodiment.

FIG. 17 is a diagram illustrating an example of expressing 256 grayscales including black (e.g., 0 grayscale) in 8 bits of a display storage (e.g., PCM) according to an example embodiment. FIG. 18 is a block diagram illustrating a display driver IC (DDI) according to an example embodiment.

With reference to FIGS. 17 and 18, according to an embodiment, the DDI 430 may store (e.g., write) and load (e.g., read) data voltage information (e.g., pixel data) of one pixel in a pixel memory 1700 based on the control of the processor (e.g., the processor 120 of FIG. 1).

According to an embodiment, the DDI 430 may store (e.g., record) data voltage information (e.g., pixel data) in a first bit b0 to eighth bit b7 of the pixel memory 1700 in a period in which there is a V_OLED enable signal. For example, the DDI 430 may operate a counter 1812 included in a timing controller 1810 (e.g., the timing controller 540 of FIG. 5) to supply a first voltage to a plurality of first memory lines (X_sel) (e.g., the plurality of first memory lines 1010 of FIG. 10) disposed in the display storage (e.g., the first display storage 1000 of FIG. 10) in a first direction (e.g., x-axis direction, horizontal direction in FIG. 10) and to supply a second voltage to a plurality of second memory lines (Y_sel) (e.g., the second memory lines 1020 of FIG. 10) disposed in a second direction (e.g., y-axis direction, vertical direction in FIG. 10) orthogonal to the first direction according to an enable signal. For example, a first voltage may be automatically supplied to a plurality of first memory lines (X_sel), and a second voltage may be supplied to a plurality of second memory lines (Y_sel) disposed in a second direction (e.g., y-axis direction, the vertical direction in FIG. 10) according to a time determined by the counter 1812. For example, data voltage information (e.g., pixel data) (e.g., '0' or '1') may be stored (e.g., written) in the first bit b0 to the eighth bit b7 of the pixel memory 1700 by a potential difference between a first voltage supplied to the plurality of first memory lines (X_sel) and a second voltage supplied to the plurality of second memory lines (Y_sel). For example, the DDI 430 may load (e.g., read) a value ('0' or '1') stored in the first bit b0 to the eighth bit b7 of the pixel memory 1700. The DDI 430 may convert an 8-bit value ('0' or '1') stored in the first bit b0 to the eighth bit b7 of the pixel memory 1700 into an analog value (e.g., analog data voltage value) through a digital-to-analog converter 1820 (DAC). The DDI 430 may supply data voltage information of an analog value (e.g., analog data voltage value) to the pixel to control an amount of current flowing to an OLED 1830, thereby enabling the OLED 1830 to emit light with a grayscale according to data voltage information.

According to an embodiment, the DDI 430 may output a V_OLED voltage as 0V during a period when there is no V_OLED enable signal, thereby turning the OLED 1830 off and enabling to express black (e.g., 0 grayscale).

For example, the DDI 430 may enable the digital-to-analog converter (DAC) 1820 to operate while the V_OLED_ENABLE signal is '1' based on the control of the processor 120. While the V_OLED_ENABLE signal is '1', the DDI 430 may enable a V_OLED voltage to supply according to data voltage information to the OLED 1830. Thereby, the OLED 1830 may express a grayscale according to data voltage information.

For example, the DDI 430 may enable the DAC 1820 to operate while the V_OLED_ENABLE signal is '0' based on the control of the processor 120. While the V_OLED_ENABLE signal is '0', the DDI 430 may enable a V_OLED voltage of 0V to be supplied to the OLED 1830. Thereby, the OLED 1830 may be turned off to express black (e.g., 0 grayscale).

For example, in the case that the OLED 1830 disposed in the first pixel expresses black (e.g., 0 grayscale), the DDI 430 may skip an operation of loading (e.g., reading) 8-bit data voltage information from a first pixel memory (e.g., the pixel memory 1700) corresponding to the first pixel based on the control of the processor 120.

For example, in the case that an 8-bit value of data voltage information of a red pixel, a green pixel, and/or a blue pixel is '0', the DDI 430 may enable the V_OLED_ENABLE signal to be '0' to skip an operation of loading (e.g., reading) 8-bit data voltage information from the pixel memory 1700 based on the control of the processor 120.

The memory (e.g., the memory 130 of FIG. 1) of the electronic device (e.g., the electronic device 101 of FIG. 1, the electronic device 200 of FIGS. 2A and 2B, and the electronic device 300 of FIGS. 3A and 3B) according to an example embodiment may include instructions that cause the processor (e.g., the processor 120 of FIG. 1) to perform operations according to FIGS. 17 and 18.

FIG. 19 is a diagram 1900 illustrating a difference in operating speed of a display storage (PCM) and a dynamic random access memory (DRAM) according to an example embodiment.

With reference to FIG. 19, an electronic device (e.g., the electronic device 101 of FIG. 1, the electronic device 200 of FIGS. 2A and 2B, the electronic device 300 of FIGS. 3A and 3B) stores (e.g., writes) data voltage information in a pixel memory (e.g., the pixel memory 1240 of FIGS. 12 and 13, the pixel memory 1700 of FIG. 17) of the display storage (e.g., the display storage 1000 of FIG. 10, display storage 1200 of FIG. 12) during one frame period and then loads (e.g., read) data voltage information; thus, there may be different from the operation of the DRAM.

For example, after storing (e.g., writing) data in the storage, the DRAM may represent latency until loading (e.g., reading) data as tWTR. It may be identified that latency of the display storage 1200 according to an example embodiment and the DRAM is substantially the same as 3 cycles.

Latency until loading (e.g., reading) data (data voltage information) after storing (e.g., writing) data (data voltage information) according to a PCM material included in the display storage 1200 according to an example embodiment may vary, but the display storage 1200 according to an example embodiment may have latency of less than about 400 ns. For example, when storing (e.g., writing) data in the display storage 1200 according to an example embodiment, in order to reduce power consumption, the DDI (e.g., the DDI 430 of FIG. 18) may use bit-flip, set to set, and reset to reset detection methods. The DDI 430 may include circuits for driving bit-flip, set to set, and reset to reset detection methods in a peripheral portion.

Figure 20:
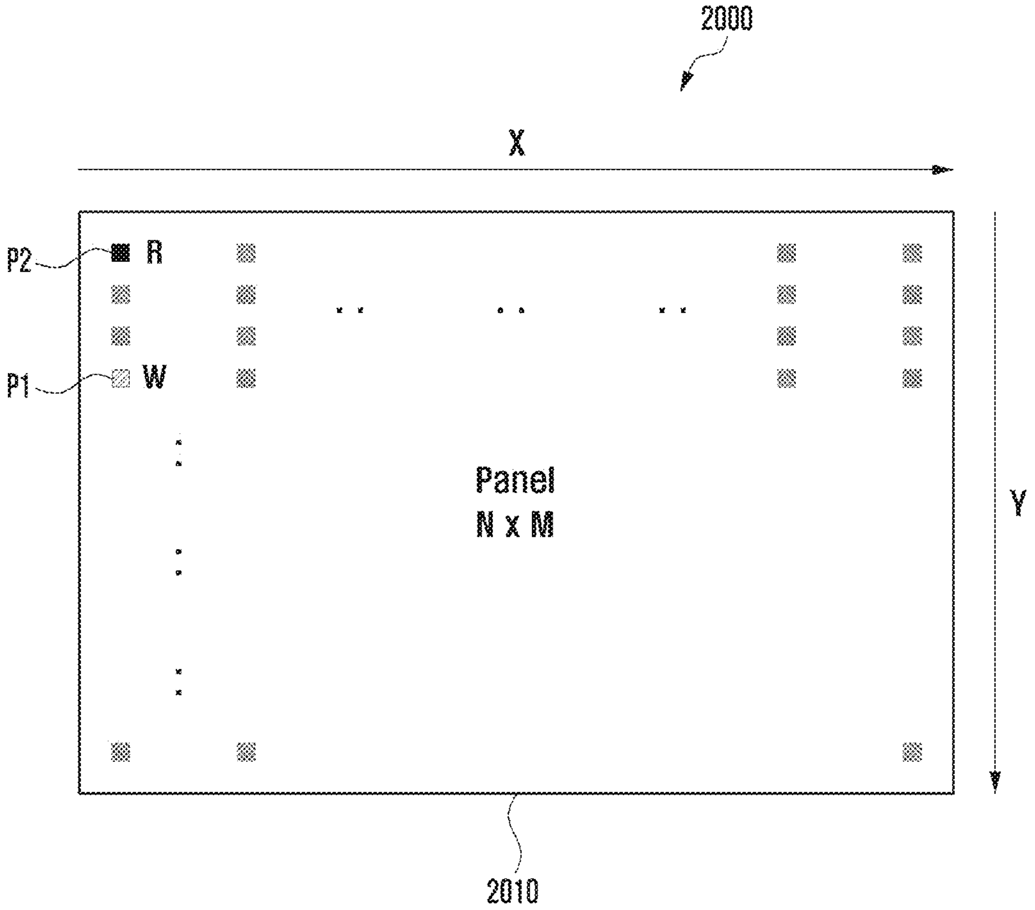
FIG. 20 is a diagram illustrating a method of compensating for a delay in read and write of a display storage (e.g., PCM) according to an example embodiment.

FIG. 20 is a diagram 2000 illustrating a method of compensating for a delay in read and write of a display storage (e.g., PCM) according to an example embodiment.

With reference to FIGS. 18 and 20, when storing (e.g., writing) and loading (e.g., reading) data (data voltage information) in a display storage (e.g., the display storage 1000 of FIG. 10, the display storage 1200 of FIG. 12) according to an example embodiment, a delay may be compensated.

According to an embodiment, the DDI 430 may simultaneously perform an operation of storing (e.g., writing) data (data voltage information) in a first pixel P1 among a plurality of pixels disposed in an OLED display 2010 and an operation of loading (e.g., reading) data (data voltage information) stored in a second pixel P2 based on the control of the processor (e.g., the processor 120 of FIG. 1). Thereby, when storing (e.g., writing) and loading (e.g., reading) data (data voltage information) in the display storages 1000 and 1200, a delay may be reduced.

For example, after data (data voltage information) may be stored (e.g., written) in a first pixel P1 and then be stored (e.g., written) in pixels of a certain number of gate lines, the data (data voltage information) stored in the first pixel P1 may be loaded (e.g., read). Thereby, a delay according to storing (e.g., writing) and loading (e.g., reading) data (data voltage information) for the same pixel may be reduced.

For example, the DDI 430 may equally supply a second voltage to a second memory line (e.g., the second memory line 1120 of FIG. 11) disposed in the Y-axis direction in the display storage (e.g., the display storage 1000 of FIG. 10, the display storage 1200 of FIG. 12) and supply different voltages to a first memory line (e.g., the first memory line 1110 of FIG. 11) and a third memory line (e.g., the third memory line 1130 of FIG. 11) disposed in the X-axis direction. Thereby, an operation of inputting (writing) information of a data voltage of the first pixel and an operation of loading (reading) a data voltage of the second pixel may be performed simultaneously. By simultaneously performing operations of inputting (writing) data voltages of the first pixel and the second pixel, a delay according to inputting (writing) and loading (reading) information of the data voltages of the pixels may be reduced. By performing an operation of inputting (writing) data voltages of the first pixel and the second pixel and performing a loading (reading) operation after progressing certain gate lines, a write to read delay for the same pixel may be compensated. For example, in the case that an OLED display 2010 operates at a resolution of 2560*2560 pixels and a driving frequency of 120 Hz, the maximum time that can be guaranteed for one pixel may be 1.27 ns. In this case, the time required for up to 2560*1280 pixels may be 4,166 us. Although the time may vary according to the PCM material, the display storages 1000 and 1200 according to an example embodiment may have a delay of about 400 ns according to storing (e.g., writing) and loading (e.g., reading) of data (data voltage information). In the case of reducing the delay to loading (e.g., reading) data (data voltage information) after storing (e.g., writing) data (data voltage information), the OLED display 2010 may be driven without being restricted by the delay according to storing (e.g., writing) and loading (e.g., reading) data (data voltage information). Further, because a start time point of a loading (e.g., reading) operation of data (data voltage information) stored in pixels may be adjusted, the OLED display 2010 may be driven without being restricted by the delay according to storing (e.g., writing) and loading (e.g., reading) data (data voltage information). Because the delay of the display is an important factor in virtual reality (VR) devices and augmented reality (AR) devices, in the case that the OLED display 2010 including the display storages 1000 and 1200 according to an example embodiment is applied to VR devices and AR devices, the influence of motion to photon latency (MTP) may be reduced.

The memory (e.g., the memory 130 of FIG. 1) of the electronic device (e.g., the electronic device 101 of FIG. 1, the electronic device 200 of FIGS. 2A and 2B, the electronic device 300 of FIGS. 3A and 3B) according to an example embodiment may include instructions that cause the processor (e.g., the processor 120 of FIG. 1) to perform operations according to FIG. 20.

An electronic device (e.g., the electronic device 101 of FIG. 1, the electronic device 200 of FIGS. 2A and 2B, the electronic device 300 of FIGS. 3A and 3B) according to an example embodiment may include a display (e.g., the display 410 of FIGS. 4 and 5) in which a plurality of pixels are disposed, display storages 1000 and 1200 in which a plurality of pixel memories (e.g., the pixel memory 1240 of FIGS. 12 and 13, the pixel memory 1700 of FIG. 17) are disposed to store data voltage information for enabling the plurality of pixels to emit light, a display driver (e.g., the DDI 430 of FIGS. 4 and 5, the DDI 430 of FIG. 18) for operating the display 410 and the display storages 1000 and 1200, a processor (e.g., the processor 120 of FIG. 1) for controlling an operation of the display driver 430, and a memory (e.g., the memory 130 of FIG. 1) operatively connected, directly or indirectly, to the processor 120. The memory 130 may include instructions that cause the processor 120, when executed, to store the data voltage information in the display storage (e.g., the display storage 1000 of FIG. 10, the display storage 1200 of FIG. 12) and load the stored data voltage information during one frame period.

According to an embodiment, the display storages 1000 and 1200 may include a plurality of first memory lines (the first memory lines 1010 of FIG. 10) disposed in a first direction so as to form the plurality of pixel memories 1240 and 1700, a plurality of second memory lines (e.g., the second memory lines 1020 of FIG. 10) disposed in a second direction orthogonal to the first direction, and phase change materials (e.g., the phase change materials 1243 of FIGS. 12 and 13) disposed between the plurality of first memory lines 1010 and the plurality of second memory lines 1020. At least one pixel memory 1240 and 1700 corresponding to each of the plurality of pixels may be disposed.

According to an embodiment, a 1-bit memory may be formed at each portion in which the plurality of first memory lines 1010 and the plurality of second memory lines 1020 intersect. Each of the plurality of pixel memories 1240 and 1700 may include at least an 8-bit memory.

According to an embodiment, when the processor 120 is executed, upon storing data voltage information during one frame period, the processor 120 may store instructions for operating the DDI. When the processor 120 is executed, the memory may enable to store the data voltage information according to an emission grayscale of organic light emitting diodes (OLEDs) disposed in the plurality of pixels in the plurality of pixel memories 1240 and 1700.

According to an embodiment, when the processor 120 is executed, upon loading data voltage information during one frame period, the processor 120 may operate the DDI to load the data voltage information stored in the plurality of pixel memories 1240 and 1700.

According to an embodiment, the processor 120 may, when executed, convert the data voltage information loaded from the plurality of pixel memories 1240 and 1700 into analog values through an analog-to-digital converter and enable to supply the analog values to the plurality of pixels.

According to an embodiment, one pixel memories 1240 and 1700 including a 9-bit memory may be formed by three first memory lines 1010, three second memory lines 1020, and phase change materials 1243 disposed at a portion in which the first memory lines 1010 and the three second memory lines 1020 intersect. The processor 120 may, when executed, store the data voltage information for expressing 256 grayscales in an 8-bit memory among the 9-bit memory, and use a 1-bit memory as a parity check bit for error checking.

According to an embodiment, the processor 120 may, when executed, enable to simultaneously perform an operation of storing first data voltage information of a first pixel in first pixel memories 1240 and 1700 and an operation of loading second data voltage information of a second pixel from second pixel memories 1240 and 1700.

According to an embodiment, the processor 120 may, when executed, store first data voltage information of the first pixel in the first pixel memories 1240 and 1700 in a first frame period. When the processor 120 is executed, in the case that there is no change in data voltage information of the first pixel in a second frame period, the processor 120 may enable to skip an operation of storing and/or loading the data voltage information of the first pixel in the second frame period.

According to an embodiment, the processor 120 may, when executed, prevent an enable signal for instructing storing and/or loading of the data voltage information from being output when a first OLED disposed in the first pixel expresses black. The processor 120 may, when executed, enable a driving voltage of 0V to be supplied to the first pixel when the first OLED disposed in the first pixel expresses black.

A method of operating electronic devices 101, 200, and 300 according to an example embodiment may store data voltage information for enabling organic light emitting diodes (OLEDs) disposed in a plurality of pixels to emit light in display storages 1000 and 1200 disposed in a display during one frame period. The data voltage information stored in the display storages 1000 and 1200 during the one frame period may be loaded. OLEDs disposed in the plurality of pixels with different grayscales in the data voltage information may emit light.

According to an embodiment, in the display storages 1000 and 1200, at least one pixel memory 1240 and 1700 corresponding to each of the plurality of pixels may be disposed. The data voltage information may be stored and loaded in at least one pixel memory 1240 and 1700 corresponding to each of the plurality of pixels.

According to an embodiment, each of the plurality of pixel memories 1240 and 1700 may include at least an 8-bit memory. The data voltage information may be stored and loaded in the 8-bit memory.

According to an embodiment, when data voltage information is stored during one frame period, the data voltage information according to an emission grayscale of OLEDs disposed in the plurality of pixels may be stored in the plurality of pixel memories 1240 and 1700.

According to an embodiment, when data voltage information is loaded during one frame period, the data voltage information stored in a plurality of pixel memories 1240 and 1700 may be loaded.

According to an embodiment, the data voltage information loaded from the plurality of pixel memories 1240 and 1700 may be converted into analog values through an analog-to-digital converter. The analog values may be supplied to the plurality of pixels.

According to an embodiment, one pixel memories 1240 and 1700 including a 9-bit memory may be composed of three first memory lines 1010, three second memory lines 1020, and phase change materials 1243 disposed at a portion in which the first memory lines 1010 and the three second memory lines 1020 intersect. The data voltage information for expressing 256 grayscales may be stored in an 8-bit memory among the 9-bit memory. The 1-bit memory may be used as a parity check bit for error checking.

According to an embodiment, an operation of storing first data voltage information of a first pixel in first pixel memories 1240 and 1700 and an operation of loading second data voltage information of a second pixel from second pixel memories 1240 and 1700 may be performed simultaneously.

According to an embodiment, first data voltage information of a first pixel may be stored in the first pixel memories 1240 and 1700 during a first frame period. In the case that there is no change in the data voltage information of the first pixel during a second frame period, an operation of storing and/or loading the data voltage information of the first pixel during the second frame period may be omitted.

According to an embodiment, when a first OLED disposed in the first pixel expresses black, an enable signal instructing storing and/or loading of the data voltage information may be prevented from being output, and a driving voltage of 0V may be supplied to the first pixel.

In an electronic device and a method of operating the same according to an example embodiment, by replacing a storage capacitor with a display storage (e.g., phase change memory (PCM)) having a non-volatile characteristic, a data voltage of each pixel of an OLED display may be stored in the display storage (e.g., PCM). By storing a data voltage of each pixel of an OLED display in the display storage (e.g., PCM), the data voltage of each pixel may be maintained during one frame and/or a plurality of frames regardless of a driving frequency of the OLED display. Thereby, even on a static screen driving the OLED display at a low scan rate such as 1 Hz, the OLED may emit light in a desired grayscale. Further, when the OLED display operates at a low scan rate or displays a fixed screen, power consumption may be reduced by skipping a continuous write operation of a data voltage.

In an electronic device and a method of operating the same according to an example embodiment, an operation of storing (e.g., writing) data (data voltage information) in a first pixel P1 and an operation of loading (e.g., reading) data (data voltage information) stored in a second pixel P2 may be simultaneously performed. Thereby, when storing (e.g., writing) and loading (e.g., reading) data (data voltage information) in the display storage 1200, a delay may be reduced.

In an electronic device and a method of operating the same according to an example embodiment, after data (data voltage information) is stored (e.g., written) in a first pixel P1 and then stored (e.g., written) in pixels of a certain number of gate lines, the data (data voltage information) stored in the first pixel P1 may be loaded (e.g., read). Thereby, a delay according to storing (e.g., writing) and loading (e.g., reading) of data (data voltage information) for the same pixel may be reduced.

In the case of applying an OLED display including a display storage according to an example embodiment to a virtual reality (VR) device and an augmented reality (AR) device, the influence of motion to photon latency (MTP) may be reduced.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device, comprising:

a display comprising a plurality of pixels;

a display storage comprising a plurality of pixel memories configured to store data voltage information so that the plurality of pixels can emit light, wherein each pixel memory of the pixel memories includes a 9-bit memory formed by three first memory lines, three second memory lines, and a plurality of phase change materials disposed at intersection of the three first memory lines and the three second memory lines;

a display driver, comprising circuitry, configured to operate the display and the display storage;

at least one processor, comprising processing circuitry, configured to control an operation of the display driver; and a memory operatively connected to the processor, wherein the memory comprises instructions that, when executed by the at least one processor, cause the electronic device to:

store the data voltage information in the display storage during one frame period and load the stored data voltage information.

2. The electronic device of claim 1, wherein the display storage comprises a plurality of first memory lines including the three first memory lines are disposed in a first direction in order to form the plurality of pixel memories, a plurality of second memory lines including the three second memory lines are disposed in a second direction orthogonal to the first direction, and at least one pixel memory corresponding to each of the plurality of pixels is disposed.

3. The electronic device of claim 2 wherein a 1-bit memory is formed proximate each portion in which the plurality of first memory lines and the plurality of second memory lines intersect.

4. The electronic device of claim 1, wherein the processor is configured to operate the display driver to store the data voltage information according to an emission grayscale of organic light emitting diodes (OLEDs) disposed in the plurality of pixels in the plurality of pixel memories, when storing data voltage information during a frame period.

5. The electronic device of claim 1, wherein, the processor is configured to operate the display driver to load the data voltage information stored in the plurality of pixel memories, when loading data voltage information during one frame period.

6. The electronic device of claim 1, wherein an analog-to-digital converter is provided and is configured so that the data voltage information loaded from the plurality of pixel memories is converted into an analog value and is supplied to the plurality of pixels.

7. The electronic device of claim 2, wherein the data voltage information for expressing 256 grayscales is to be stored in an 8-bit memory among the 9-bit memory, and a 1-bit memory is configured to be used as a parity check bit for error checking.

8. The electronic device of claim 1, wherein the processor is configured to simultaneously perform an operation of storing first data voltage information of a first pixel in a first pixel memory and an operation of loading second data voltage information of a second pixel in a second pixel memory.

9. The electronic device of claim 1, wherein the processor is configured to:

store first data voltage information of a first pixel in a first pixel memory in a first frame period, and skip an operation of storing and/or loading data voltage information of the first pixel in a second frame period in a case where there is no change in data voltage information of the first pixel in the second frame period.

10. The electronic device of claim 1, wherein the processor is configured to:

prevent an enable signal that instructs storing and/or loading of the data voltage information from being output when a first OLED disposed in a first pixel expresses black, and control to supply a driving voltage of 0V to the first pixel.

11. A method of operating an electronic device, the method comprising:

storing data voltage information for causing organic light emitting diodes (OLEDs) disposed in a plurality of pixels to emit light in a display storage disposed in a display during a frame period, the display storage comprising a plurality of pixel memories configured to store data voltage information so that the plurality of pixels can emit light, wherein each pixel memory of the pixel memories includes a 9-bit memory formed by three first memory lines, three second memory lines, and a plurality of phase change materials disposed at intersection of the three first memory lines and the three second memory lines;

loading the data voltage information stored in the display storage during the frame period; and causing OLEDs disposed in a plurality of pixels to emit light with different grayscales in the data voltage information.

12. The method of claim 11, wherein in the display storage, at least one pixel memory corresponding to each of the plurality of pixels is disposed, and the display storage stores and loads the data voltage information in at least one pixel memory corresponding to each of the plurality of pixels.

13. The method of claim 11, wherein the data voltage information is stored and loaded in the 9-bit memory.

14. The method of claim 11, wherein, when storing data voltage information during the frame period, the data voltage information according to an emission grayscale of the OLEDs disposed in the plurality of pixels is stored in the plurality of pixel memories.

15. The method of claim 11, wherein, when loading data voltage information during the frame period, the data voltage information stored in the plurality of pixel memories is loaded.

16. The electronic device of claim 1, wherein the data voltage information is stored in the plurality of pixel memories and includes multi-bit digital data, the multi-bit digital data is loaded from the plurality of pixel memories, and the memory comprises instructions that, when executed by the at least one processor, cause the electronic device to:

convert the multi-bit digital data into an analog value of voltage through an analog-to-digital converter for driving the pixels.

17. An electronic device, comprising:

memory storing instructions;

a display comprising a plurality of pixels;

a display storage comprising a plurality of pixel memories configured to store data for driving the plurality of pixels to emit light;

a display driver, comprising circuitry, configured to operate the display and the display storage; and at least one processor, comprising processing circuitry, configured to control an operation of the display driver, and operatively connected to the display, the memory, the display storage, and the display driver, wherein the instructions, when executed by the at least one processor, cause the electronic device to:

store the data in the display storage during one frame period;

load the stored data from the plurality of pixel memories; and convert the data into an analog value of voltage through a digital-to-analog converter, wherein each of the plurality of pixel memories include a 9-bit memory formed by three first memory lines, three second memory lines, and a plurality of phase change materials disposed at portions in which the three first memory lines and the three second memory lines intersect.

18. The electronic device of claim 17, wherein the display storage comprises a plurality of first memory lines disposed in a first direction, a plurality of second memory lines disposed in a second direction orthogonal to the first direction, and in the display storage, at least one pixel memory corresponding to each of the plurality of pixels is disposed.

19. The electronic device of claim 17, wherein the instructions, when executed by the at least one processor, cause the electronic device to operate the display driver to store the data according to an emission grayscale of organic light emitting diodes (OLEDs) disposed in the plurality of pixels in the plurality of pixel memories, when storing data during a frame period.

20. The electronic device of claim 17, wherein the instructions, when executed by the at least one processor, cause the electronic device to simultaneously perform an operation of storing first data of a first pixel in a first pixel memory and an operation of loading second data of a second pixel in a second pixel memory.

* * * * *